United States Patent
Cha et al.

(10) Patent No.: US 12,418,890 B2
(45) Date of Patent: Sep. 16, 2025

(54) METHOD FOR TRANSMITTING AND RECEIVING SIGNAL IN WIRELESS COMMUNICATION SYSTEM, AND DEVICE FOR SUPPORTING SAME

(71) Applicant: LG ELECTRONICS INC., Seoul (KR)

(72) Inventors: Hyunsu Cha, Seoul (KR); Kijun Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 720 days.

(21) Appl. No.: 17/632,858

(22) PCT Filed: Aug. 6, 2020

(86) PCT No.: PCT/KR2020/010410
§ 371 (c)(1),
(2) Date: Feb. 4, 2022

(87) PCT Pub. No.: WO2021/025489
PCT Pub. Date: Feb. 11, 2021

(65) Prior Publication Data
US 2022/0322297 A1 Oct. 6, 2022

(30) Foreign Application Priority Data
Aug. 6, 2019 (KR) .......................... 10-2019-0095256

(51) Int. Cl.
*H04W 72/02* (2009.01)
*H04L 5/00* (2006.01)
(Continued)

(52) U.S. Cl.
CPC ........... *H04W 72/02* (2013.01); *H04L 5/0051* (2013.01); *H04W 72/0446* (2013.01); *H04W 72/542* (2023.01)

(58) Field of Classification Search
CPC ............. H04W 72/02; H04W 72/0446; H04W 72/542; H04L 5/0051; H04B 7/0617; H04B 17/24; H04B 17/27
See application file for complete search history.

(56) References Cited

U.S. PATENT DOCUMENTS

2011/0117926 A1 5/2011 Hwang et al.
2018/0323845 A1* 11/2018 Chang ................. H04L 25/0224
(Continued)

FOREIGN PATENT DOCUMENTS

KR 10-2016-0121160 A 10/2016
KR 10-2018-0018237 A 2/2018
KR 10-2018-0087280 A 8/2018

*Primary Examiner* — Schquita D Goodwin
(74) *Attorney, Agent, or Firm* — BRYAN CAVE LEIGHTON PAISNER LLP

(57) ABSTRACT

Various embodiments of the present disclosure relate to a next generation wireless communication system for supporting a data transmission rate and the like higher than that of a $4^{th}$ generation (4G) wireless communication system. According to the various embodiments of the disclosure, a method for transmitting and receiving a signal in a wireless communication system, and a device for supporting same can be provided.

13 Claims, 29 Drawing Sheets

(51) Int. Cl.
*H04W 72/0446* (2023.01)
*H04W 72/08* (2009.01)
*H04W 72/542* (2023.01)

(56) References Cited

U.S. PATENT DOCUMENTS

| | | |
|---|---|---|
| 2019/0007181 A1 | 1/2019 | Marinier et al. |
| 2019/0090092 A1* | 3/2019 | Hwang ................ G01S 5/0215 |
| 2020/0351813 A1* | 11/2020 | Manolakos ............ H04W 24/10 |
| 2021/0239783 A1* | 8/2021 | Calcev ................ G01S 5/0215 |
| 2022/0159415 A1* | 5/2022 | Khoryaev ............. H04W 64/00 |
| 2022/0311488 A1* | 9/2022 | Shreevastav ......... H04B 7/0408 |
| 2022/0353696 A1* | 11/2022 | Shreevastav .......... G01S 5/0036 |

\* cited by examiner

FIG. 7
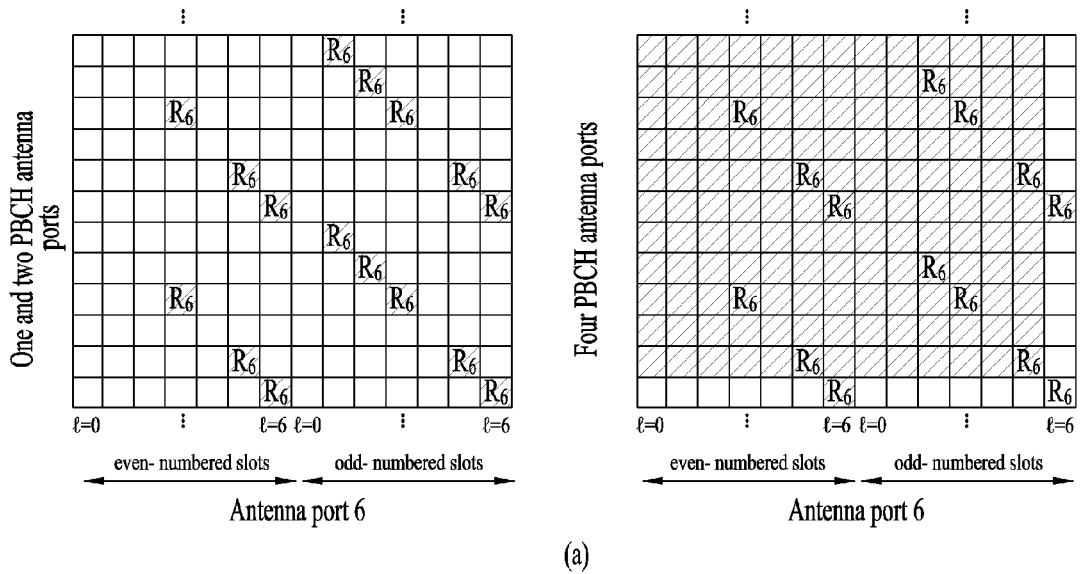
(a)
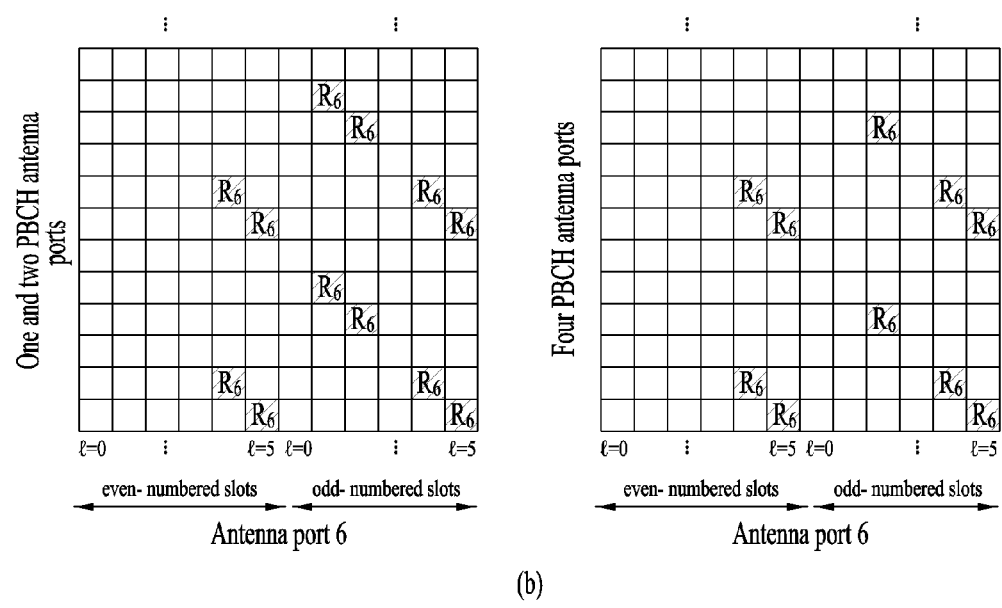
(b)

FIG. 13
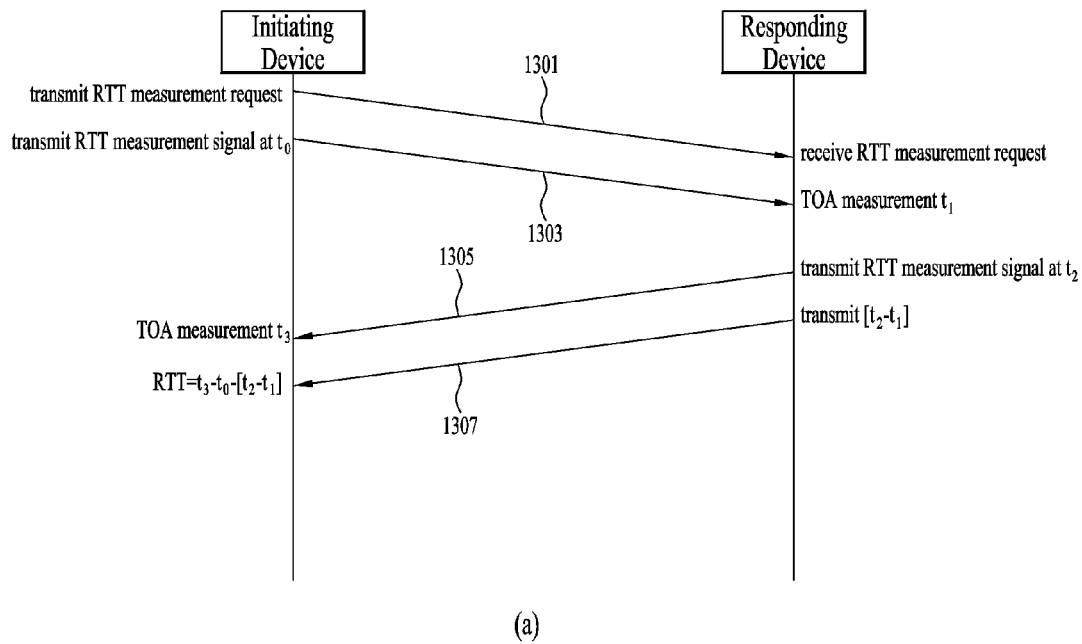
(a)
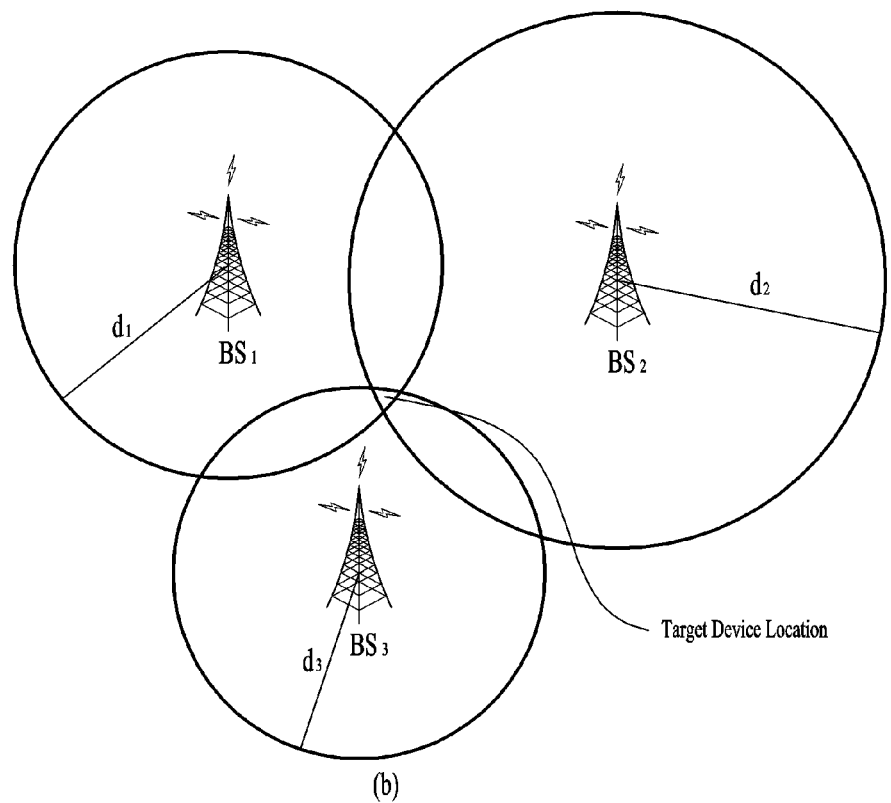
(b)

METHOD FOR TRANSMITTING AND RECEIVING SIGNAL IN WIRELESS COMMUNICATION SYSTEM, AND DEVICE FOR SUPPORTING SAME

This application is the National Stage filing under 35 U.S.C. 371 of International Application No. PCT/KR2020/010410 filed on Aug. 6, 2020, which claims priority to Korean Patent Application No. 10-2019-0095256 filed on Aug. 6, 2019, the contents of which are all hereby incorporated by reference herein in their entirety.

TECHNICAL FIELD

Various embodiments of the present disclosure relate to a wireless communication system.

BACKGROUND ART

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DETAILED DESCRIPTION OF THE DISCLOSURE

Technical Task

Various embodiments may provide a method of transmitting and receiving a signal in a wireless communication system and apparatus for supporting the same.

For example, various embodiments of the present disclosure may provide a positioning method in a wireless communication system and apparatus for supporting the same.

For example, various embodiments of the present disclosure may provide a positioning method in a wireless communication system and apparatus for supporting the same, by which a Reference Signal (RS) for UE positioning may be clearly distinguished from a noise signal.

For example, various embodiments of the present disclosure may provide a method of selecting one or more RSs for positioning from RSs received based on beams in different directions in a wireless communication system by further considering a second measurement value (e.g., RSRP, etc.) related to signal quality in addition to a first measurement value (e.g., propagation time, etc.) and apparatus for supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solutions

Various embodiments of the present disclosure may provide a method of transmitting and receiving a signal in a wireless communication system and apparatus for supporting the same.

In one technical aspect of the present disclosure, provided is a method performed by a UE in a wireless communication system.

The method may include receiving reference signal (RS) resources based on different beams and transmitting a measurement value for positioning based on one or more first RS resources selected from the RS resources.

The one or more first RS resources may be selected based on a propagation time of each of one or more second RS resources among the RS resources.

The one or more second RS resources may be selected from the RS resources based on measurement values for signal qualities of the RS resources.

The one or more second RS resources may be selected based on being related to a measurement value for a signal quality within upper M or upper X1 percent among measurement values for signal qualities of the RS resources.

The M or X1 may be configured by a location management function (LMF), a location server or a base station.

The M may be a natural number.

The X1 may be a real number exceeding 0.

The one or more second RS resources may be selected based on being related to the measurement value for the signal quality exceeding a first threshold configured each.

Based on a measurement value for a signal quality of one or more third RS resources related to a first arrival path among the RS resources: (i) exceeding X2 percent of a maximum value among measurement values for the signal qualities of the RS resources, an average value of the measurement values, a value corresponding to upper or lower X3 percent among the measurement values, or a configured second threshold, the one or more first RS resources may include the one or more third RS resources; or (ii) failing to exceed X2 percent of the maximum value, the average value of the measurement values, the value corresponding to the upper or lower X3 percent among the measurement values, or the second threshold, the one or more first RS resources may include one or more RS resources related to the maximum value, The X2 or X3 may be configured from an LMF, a location server, or a base station, The X2 may be a real number exceeding 0, and The X3 may be a real number exceeding 0.

The method may further include transmitting information related to an Identifier (ID) of each of the one or more first RS resources.

Based on being determined that a propagation measurement value related to an RS resource included in the one or more second RS resources is equal to a propagation time measurement value related to an RS resource included in the one or more RS resources, the one or more first RS resources may include an RS resource having a greater measurement value for the signal quality among an RS resource included in the one or more second RS resources and an RS resource included in the one or more RS resources In another technical aspect of the present disclosure, provided is an apparatus operating in a wireless communication system.

The apparatus may include a memory and one or more processors connected to the memory.

The one or more processors may receive reference signal (RS) resources based on different beams and transmit a measurement value for positioning based on one or more first RS resources selected from the RS resources.

The one or more first RS resources may be selected based on a propagation time of each of one or more second RS resources among the RS resources.

The one or more second RS resources may be selected from the RS resources based on measurement values for signal qualities of the RS resources.

The one or more second RS resources may be selected based on being related to a measurement value for a signal quality within upper M or upper X1 percent among measurement values for signal qualities of the RS resources, The M or X1 may be configured by a location management function (LMF), a location server or a base station.

The M may be a natural number.

The X1 may be a real number exceeding 0.

The one or more second RS resources may be selected based on being related to the measurement value for the signal quality exceeding a first threshold configured each.

Based on a measurement value for a signal quality of one or more third RS resources related to a first arrival path among the RS resources: (i) exceeding X2 percent of a maximum value among measurement values for the signal qualities of the RS resources, an average value of the measurement values, a value corresponding to upper or lower X3 percent among the measurement values, or a configured second threshold, the one or more first RS resources may include the one or more third RS resources; or (ii) failing to exceed X2 percent of the maximum value, the average value of the measurement values, the value corresponding to the upper or lower X3 percent among the measurement values, or the second threshold, the one or more first RS resources may include one or more RS resources related to the maximum value.

The X2 or X3 may be configured from an LMF, a location server, or a base station, The X2 may be a real number exceeding 0, and The X3 may be a real number exceeding 0.

The one or more processors may transmit information related to an Identifier (ID) of each of the one or more first RS resources.

Based on being determined that a propagation measurement value related to an RS resource included in the one or more second RS resources is equal to a propagation time measurement value related to an RS resource included in the one or more RS resources, the one or more first RS resources may include an RS resource having a greater measurement value for the signal quality among an RS resource included in the one or more second RS resources and an RS resource included in the one or more RS resources The apparatus may communicate with one or more of a mobile terminal, a network, and an autonomous vehicle other than a vehicle having the apparatus.

In another aspect of the present disclosure, provided is an apparatus operating in a wireless communication system.

The apparatus may include one or more processors and one or more memories storing one or more instructions to enable the one or more processors to perform a method.

The method may include receiving reference signal (RS) resources based on different beams and transmitting a measurement value for positioning based on one or more first RS resources selected from the RS resources.

The one or more first RS resources may be selected based on a propagation time of each of one or more second RS resources among the RS resources.

The one or more second RS resources may be selected from the RS resources based on measurement values for signal qualities of the RS resources.

In further technical aspect of the present disclosure, provided is a processor-readable medium storing one or more instructions to enable one or more processors to perform a method.

The method may include receiving reference signal (RS) resources based on different beams and transmitting a measurement value for positioning based on one or more first RS resources selected from the RS resources.

The one or more first RS resources may be selected based on a propagation time of each of one or more second RS resources among the RS resources.

The one or more second RS resources may be selected from the RS resources based on measurement values for signal qualities of the RS resources.

Various embodiments as described above are only some of preferred embodiments of the various embodiments, and those skilled in the art may derive and understand many embodiments in which technical features of the various embodiments are reflected based on the following detailed description.

Advantageous Effects

According to various embodiments of the present disclosure, a method of transmitting and receiving a signal in a wireless communication system and apparatus for supporting the same may be provided.

For example, according to various embodiments of the present disclosure, a positioning method in a wireless communication system and apparatus for supporting the same may be provided.

For example, according to various embodiments of the present disclosure, a Reference Signal (RS) for UE positioning is clearly distinguished from a noise signal, thereby improving positioning accuracy.

For example, according to various embodiments of the present disclosure, in selecting one or more RSs for positioning from RSs received based on beams in different directions in a wireless communication system, the selection is made in a manner of further considering a second measurement value (e.g., RSRP, etc.) related to signal quality in addition to a first measurement value (e.g., propagation time, etc.), thereby improving positioning accuracy.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

FIG. 7 illustrates exemplary mapping of a positioning reference signal (PRS) in a long term evolution (LTE) system to which various embodiments of the present disclosure are applicable.

FIG. 13 is a diagram illustrating a multi-round trip time (multi-RTT) positioning method to which various embodiments are applicable.

MODE FOR DISCLOSURE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
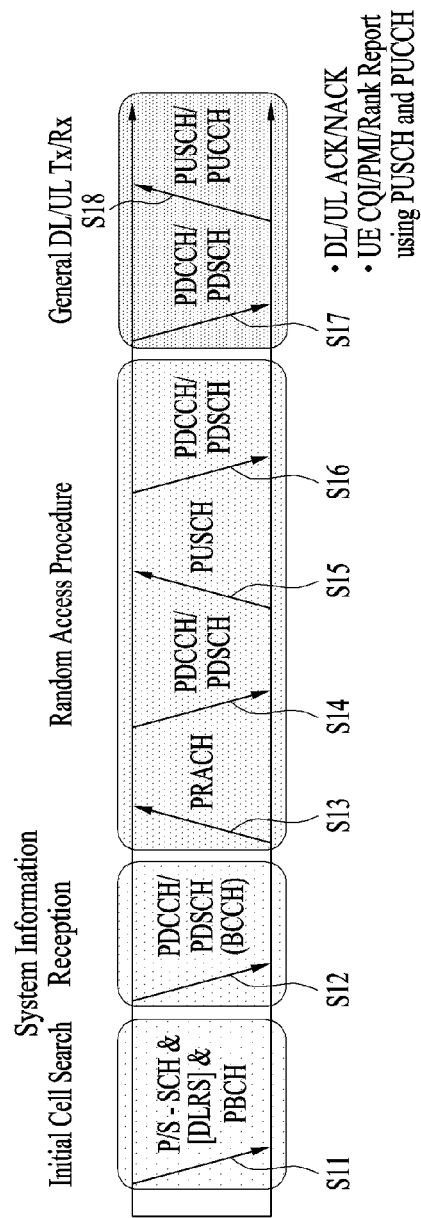
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

Thereafter, the UE may obtain in-cell broadcast information by receiving a Physical Broadcast Channel (PBCH) signal from the BS.

Meanwhile, the UE may check a DL channel state by receiving a Downlink Reference Signal (DL RS) in the initial cell search step.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

Meanwhile, when the random access procedure is performed in two steps, S13/S15 may be performed as a single operation of performing transmission by the UE and S14/S16 may be performed as a single operation of performing transmission by the BS.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
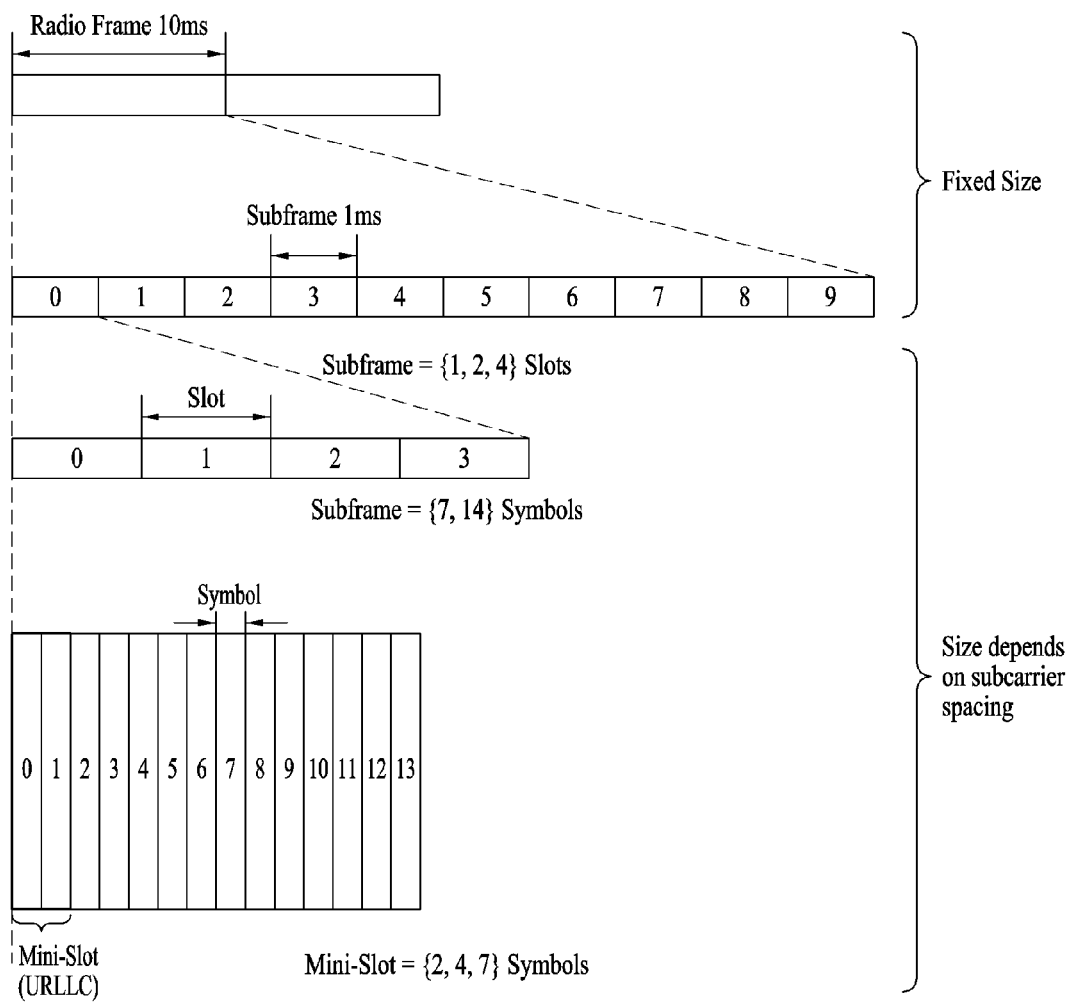
FIG. 2 is a diagram illustrating a resource grid in a new radio (NR) system to which various embodiments are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, p and a CP are obtained from RRC parameters provided by the BS.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c = 1/(\Delta f_{max} * N_f)$ where $\Delta f_{max} = 480*10^3$ Hz and a value $N_f$ related to a fast Fourier transform (FFT) size or an inverse fast Fourier transform (IFFT) size is given as $N_f = 4096$. $T_c$ and $T_s$ which is an LTE-based time unit and sampling time, given as $T_s = 1/((15 \text{ kHz})*2048)$ are placed in the following relationship: $T_s/T_c = 64$. DL and UL transmissions are organized into (radio) frames each having a duration of $T_f = (\Delta f_{max} * N_f/100) * T_c = 10$ ms. Each radio frame includes 10 subframes each having a duration of $T_{sf} = (\Delta f_{max} * N_f/1000) * T_c = 1$ ms. There may exist one set of frames for UL and one set of frames for DL. For a numerology μ, slots are numbered with $n^\mu_s \in \{0, \ldots, N^{slot,\mu}_{subframe}-1\}$ in an increasing order in a subframe, and with $n^\mu_{s,f} \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s * N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with p=2 (i.e., an SCS of 60 kHz), in which referring to Table 3, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
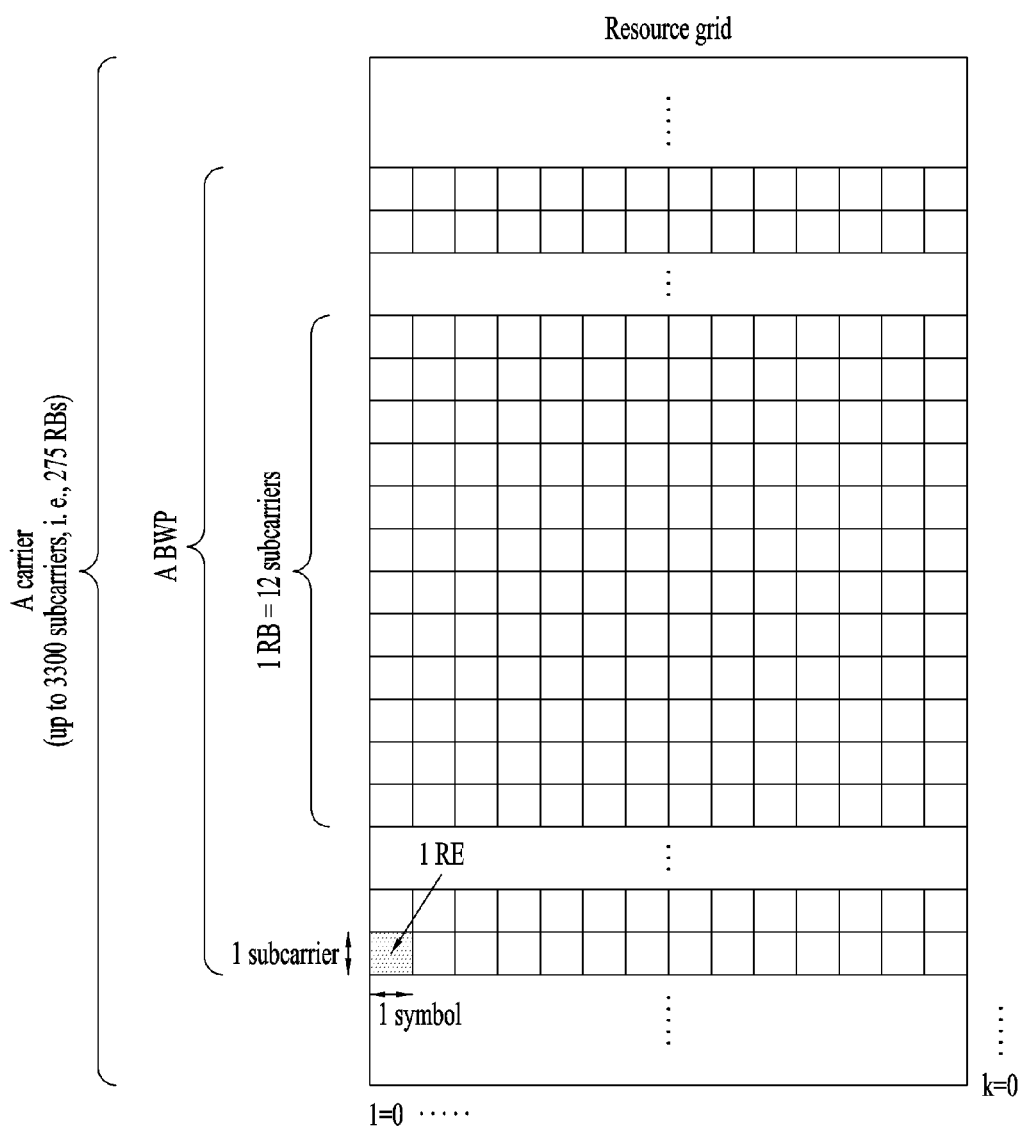
FIG. 3 is a diagram illustrating mapping of physical channels in a slot, to which various embodiments are applicable.

FIG. 3 is a diagram illustrating a slot structure in an NR system to which various embodiments of the present disclosure are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
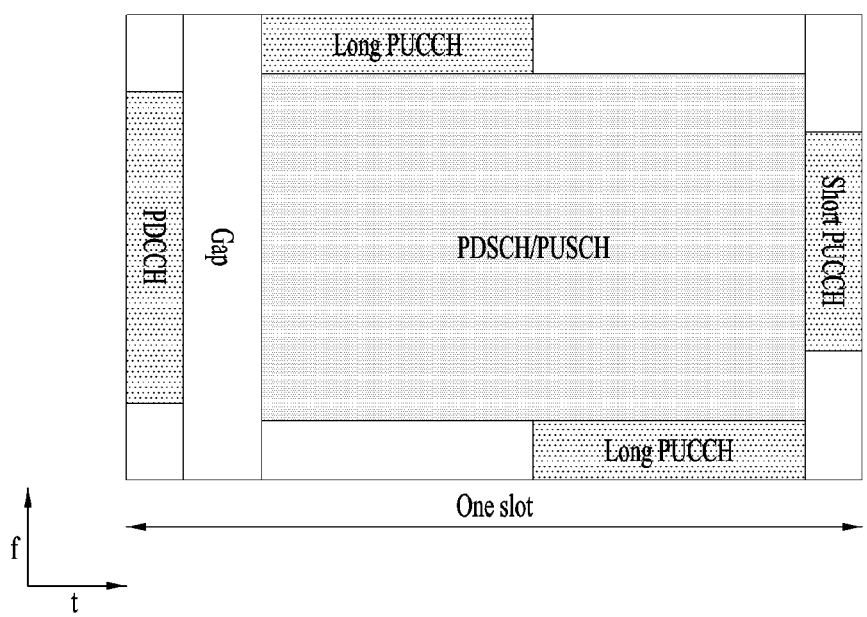
FIG. 4 is a diagram illustrating one example of mapping a physical channel in a slot, to which various embodiments of the present disclosure are applicable.

FIG. 4 is a diagram illustrating one example of mapping a physical channel in a slot, to which various embodiments of the present disclosure are applicable.

DL control channel, DL or UL data, UL control channel and the like may be included in a single slot. For example, first N symbols in a slot may be used in transmitting a DL control channel (hereinafter, DL control region), and last M symbols in the slot may be used in transmitting a UL control channel (hereinafter, UL control region). N and M are integers equal to or greater than 0 each. A resource region (hereinafter, data region) between the DL control region and the UL control region may be used for DL data transmission or UL data transmission. A time gap for DL-to-UL or UL-to-DK switching may exist between a control region and a data region. PDCCH may be transmitted in the DL control region, and PDSCH may be transmitted in the DL data region. Some symbols of DL-to-UL switching in a slot may be used as a time gap.

1.3. Channel Structures 1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.4. UL-DL Timing Relationship

Figure 5:
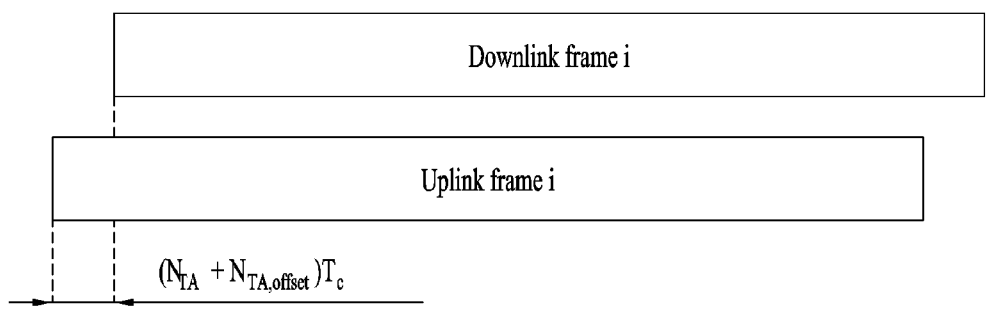
FIG. 5 is a diagram illustrating an exemplary UL-DL timing relationship, which is applicable to various embodiments of the present disclosure.

FIG. 5 is a diagram illustrating an exemplary UL-DL timing relationship applicable to various embodiments of the present disclosure.

Referring to FIG. 5, a UE starts to transmit UL frame i $T_{TA}(=(N_{TA}+N_{TA,offset})T_c)$ seconds before a DL radio frame corresponding to UL frame i. However, $T_{TA}=0$ exceptionally for a msgA transmission on a PUSCH. $T_c=0.509$ ns The UE may be provided with a value $N_{TA,offset}$ of a timing advance (TA) offset for a serving cell by n-TimingAdvanceOffset for the serving cell. When the UE is not provided with n-TimingAdvanceOffset for the serving cell, the UE may determine a default value $N_{TA,offset}$ of the TA offset for the serving cell.

In the case of a random access response, a TA command, $T_A$ for a timing advance group (TAG) indicates $N_{TA}$ values by index values of $T_A=0, 1, 2, \ldots, 3846$, where an amount of the time alignment for a TAG with an SCS of $2^\mu*15$ kHz is $N_{TA}$ (=$T_A*16*64/2^\mu$). $N_{TA}$ is relative to the SCS of a first UL transmission from the UE after reception of a random access response.

In other cases, a TA command, TA for a TAG indicates adjustment of a current $N_{TA}$ value, $N_{TA\_old}$ to a new $N_{TA}$ value, $N_{TA\_new}$ by index values of $T_A$ (=0, 1, 2, \ldots, 63), where for a SCS of $2^\mu*15$ kHz, $N_{TA\_new}=N_{TA\_old}$ ($T_A-31$) *$16*64/2^\mu$.

2. Positioning

Positioning may be a process of determining the geographical location and/or speed of a UE based on the measurement of a radio signal. A client (e.g., application) related to the UE may request location information, and the location information may be reported to the client. The location information may be included in a core network or requested by the client connected to the core network. The location information may be reported in a standard format such as cell-based or geographical coordinates. Herein, an estimation error of the location and speed of the UE and/or a positioning method used for the positioning may also be reported.

2.1. Positioning Protocol Configuration

Figure 6:
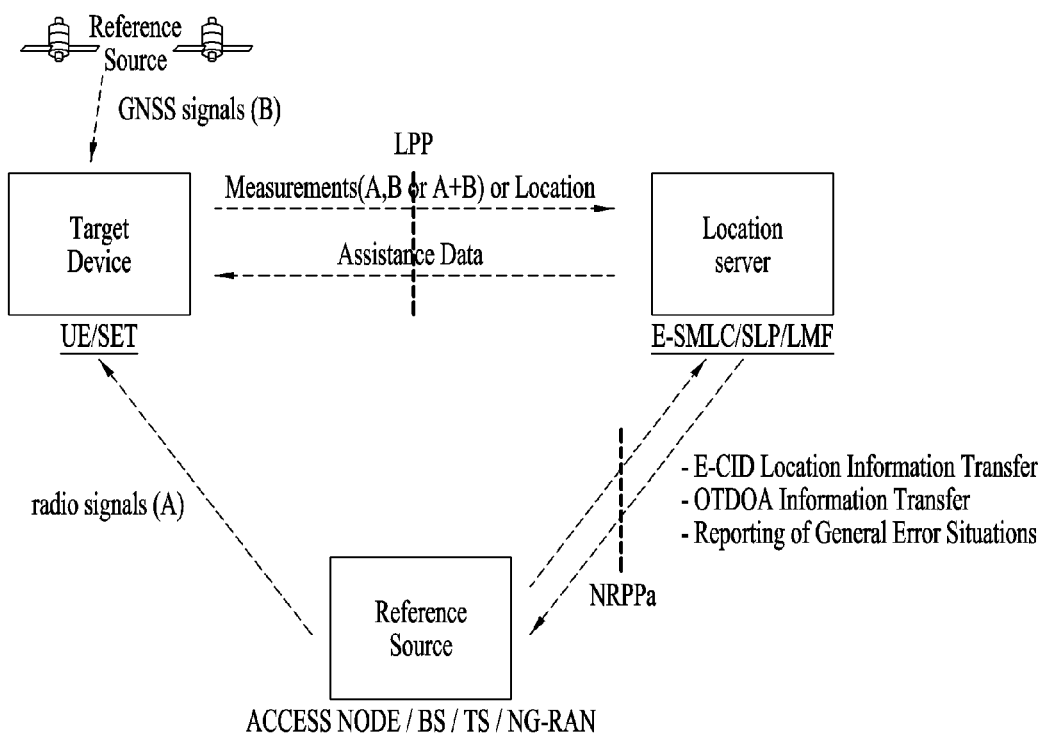
FIG. 6 is a diagram illustrating an exemplary positioning protocol configuration for UE positioning, which is applicable to various embodiments of the present disclosure.

FIG. 6 is a diagram illustrating an exemplary positioning protocol configuration for UE positioning, to which various embodiments of the present disclosure are applicable.

Referring to FIG. 6, an LTE positioning protocol (LPP) may be used as a point-to-point protocol between a location server (E-SMLC and/or SLP and/or LMF) and a target device (UE and/or SET) in order to position a target device based on positioning-related measurements obtained from one or more reference sources. The target device and the location server may exchange measurements and/or location information based on signal A and/or signal B through the LPP.

NR positioning protocol A (NRPPa) may be used for exchanging information between a reference source (access node and/or BS and/or TP and/or NG-RAN node) and a location server.

NRPPa may provide the following functions:
E-CID Location Information Transfer. This function allows exchange of location information between a reference source and an LMF, for the purpose of E-CID positioning.

OTDOA Information Transfer. This function allows exchange of information between the reference source and the LMF for the purpose of OTDOA positioning.

Reporting of General Error Situations. This function allows reporting of general error situations, for which function specific error messages have not been defined.

2.2. PRS in LTE System

For such positioning, a positioning reference signal (PRS) may be used. The PRS is a reference signal used to estimate the position of the UE.

For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as subframe #0. If only MBSFN subframes are configured as the positioning subframes within a cell, OFDM symbols configured for the PRS in the MBSFN subframes may have an extended CP.

The sequence of the PRS may be defined by Equation 1 below.

$$r_{l,n_s}(m) = \frac{1}{\sqrt{2}}(1 - 2\cdot(2m)) + j\frac{1}{\sqrt{2}}(1 - 2\cdot c(2m+1)),$$

$$m = 0, 1, \ldots, 2N_{RB}^{max,DL} - 1$$

[Equation 1]

In Equation 1, $n_s$ denotes a slot number in a radio frame and 1 denotes an OFDM symbol number in a slot. $N_{RB}^{max,DL}$ is the largest of DL bandwidth configurations, expressed as $N_{SC}^{RB}$. $N_{SC}^{RB}$ denotes the size of an RB in the frequency domain, for example, 12 subcarriers.

c(i) denotes a pseudo-random sequence and may be initialized by Equation 2 below.

$$c_{init}=2^{28}\cdot\lfloor N_{ID}^{PRS}/512 \rfloor + 2^{10}\cdot(7\cdot(n_s+1)+l+1)\cdot(2\cdot(N_{ID}^{PRS} \bmod 512)+1)+2\cdot(N_{ID}^{PRS} \bmod 512)+N_{CP}$$

[Equation 2]

Unless additionally configured by higher layers, $N_{ID}^{PRS}$ is equal to $N_{ID}^{cell}$ and $N_{CP}$ is 1 for a normal CP and 0 for an extended CP.

Figure 11:
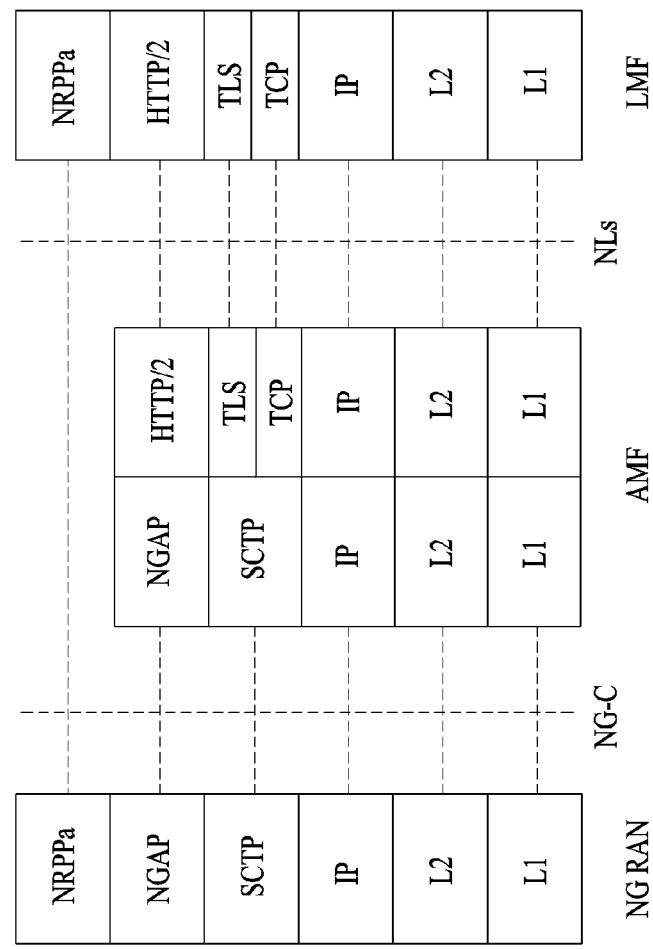
FIG. 11 is a diagram illustrating protocol layers for supporting NR positioning protocol A (NRPPa) protocol data unit (PDU) transmission, to which various embodiments are applicable.

FIG. 11 illustrates an exemplary pattern to which a PRS is mapped in a subframe.

As illustrated in FIG. 11, the PRS may be transmitted through an antenna port 6. FIG. 11(a) illustrates mapping of the PRS in the normal CP and FIG. 11(b) illustrates mapping of the PRS in the extended CP.

The PRS may be transmitted in consecutive subframes grouped for position estimation. The subframes grouped for position estimation are referred to as a positioning occasion. The positioning occasion may consist of 1, 2, 4 or 6 subframe. The positioning occasion may occur periodically with a periodicity of 160, 320, 640 or 1280 subframes. A cell-specific subframe offset value may be defined to indicate the starting subframe of PRS transmission. The offset value and the periodicity of the positioning occasion for PRS transmission may be derived from a PRS configuration index as listed in Table 11 below.

TABLE 5

| PRS configuration Index ($I_{PRS}$) | PRS periodicity (subframes) | PRS subframe offset (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-2404 | 5 | $I_{PRS}$ − 2400 |
| 2405-2414 | 10 | $I_{PRS}$ − 2405 |
| 2415-2434 | 20 | $I_{PRS}$ − 2415 |
| 2435-2474 | 40 | $I_{PRS}$ − 2435 |
| 2475-2554 | 80 | $I_{PRS}$ − 2475 |
| 2555-4095 | Reserved | |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed as a low-interference subframe so that no data is transmitted in the positioning subframe. Therefore, the PRS is not subjected to interference due to data transmission although the PRS may interfere with PRSs of other cells.

2.3. UE Positioning Architecture in NR System

Figure 8:
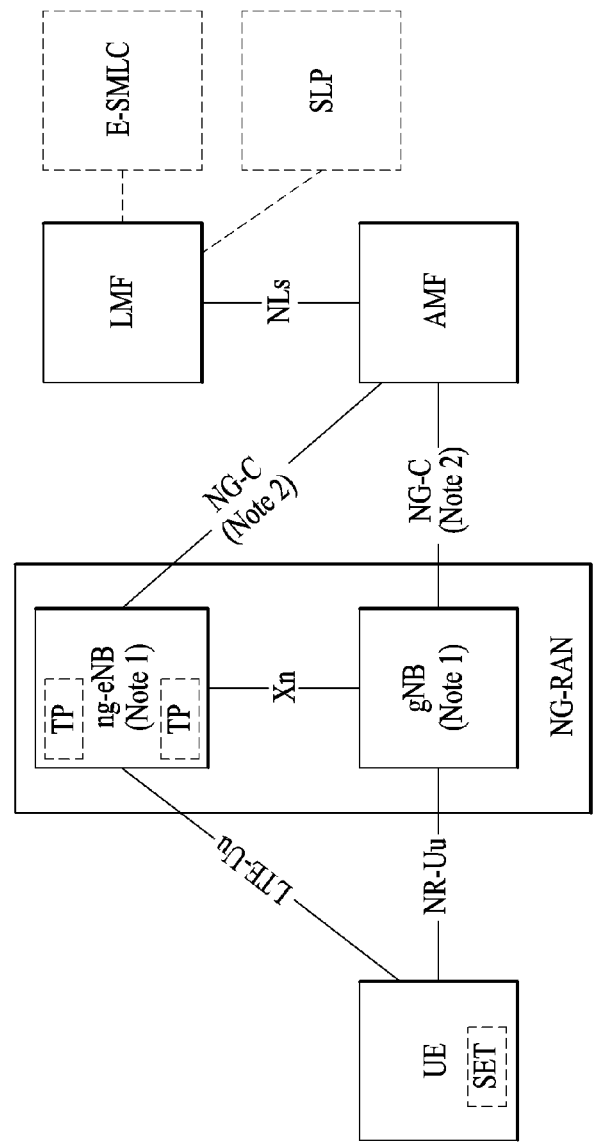
FIG. 8 is a diagram illustrating an example of an architecture of a system for positioning a UE, to which various embodiments of the present disclosure are applicable.

FIG. 8 illustrates architecture of a 5G system applicable to positioning of a UE connected to an NG-RAN or an E-UTRAN.

Referring to FIG. 8, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 9:
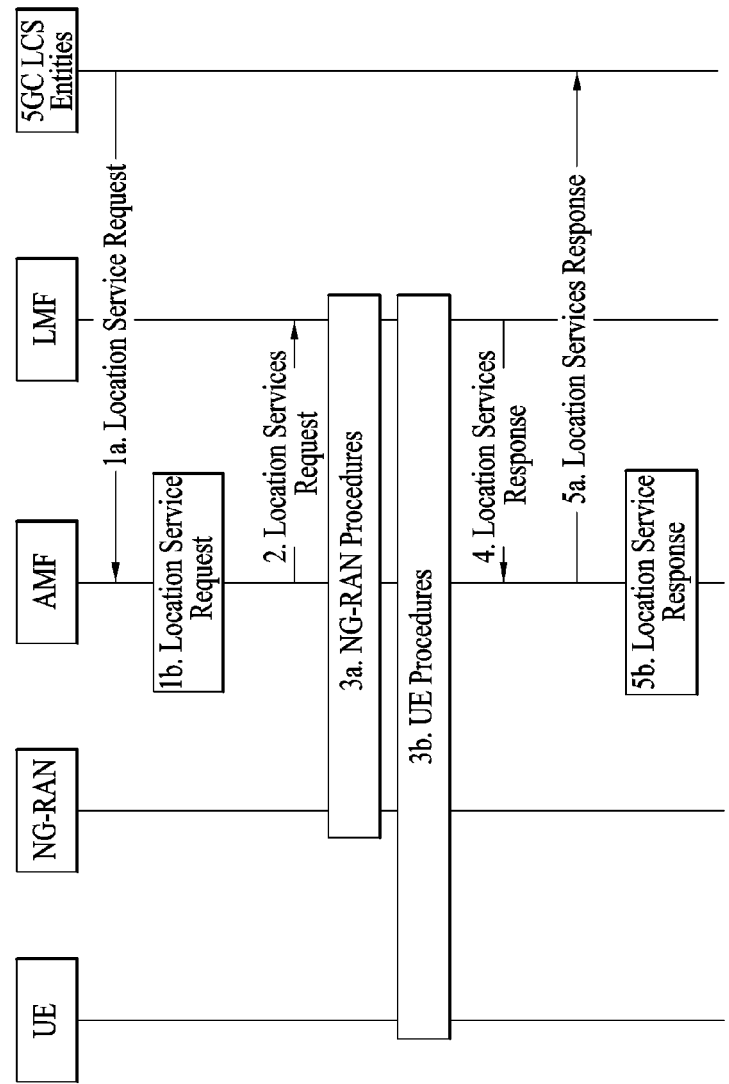
FIG. 9 is a diagram illustrating an example of a procedure of positioning a UE, to which various embodiments of the present disclosure are applicable.

FIG. 9 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 9 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 9. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC. If the procedure of FIG. 9 has been initiated by step 1b, the AMF may use the location service response in order to provide a location service related to an emergency call.

2.5. Positioning Protocol 2.5.1. LTE Positioning Protocol (LPP)

Figure 10:
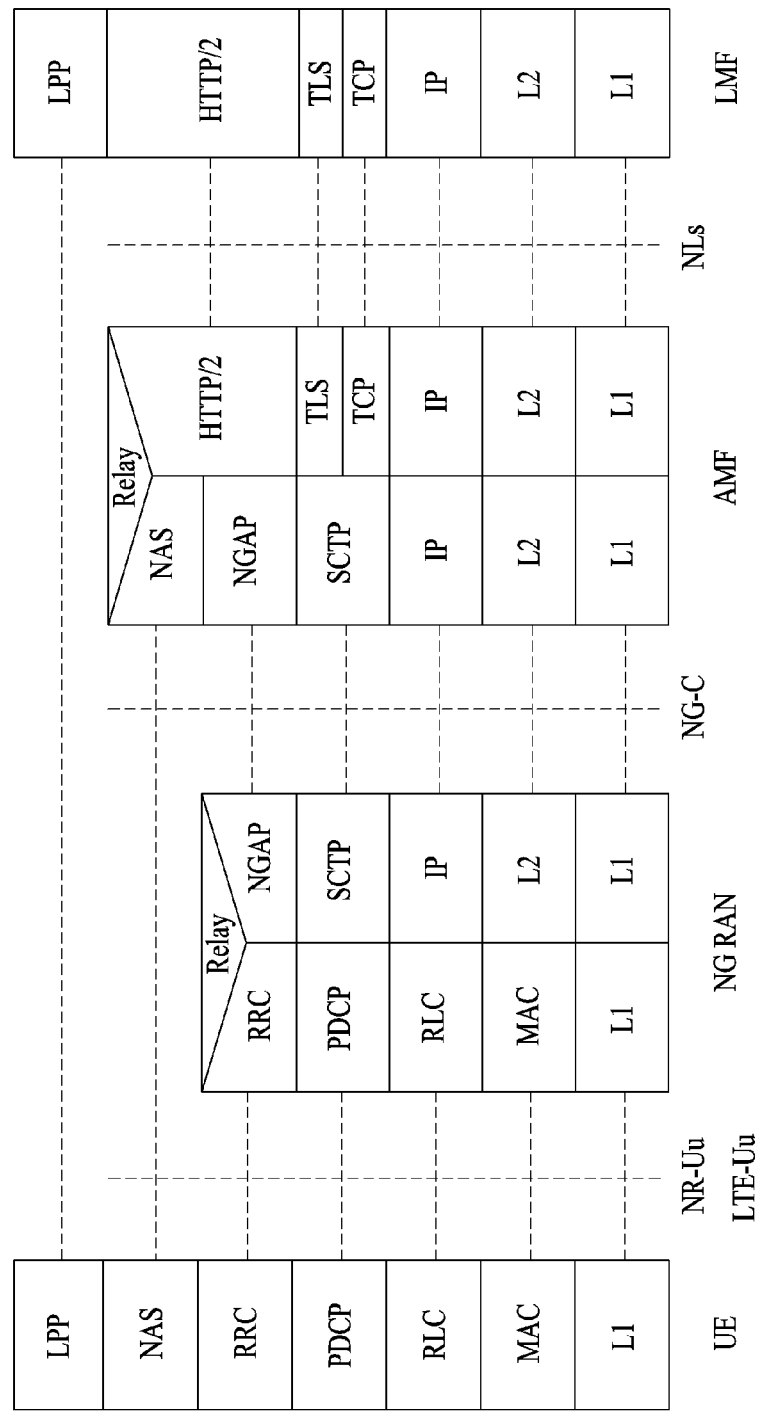
FIG. 10 is a diagram illustrating protocol layers for supporting LTE positioning protocol (LPP) message transmission, to which various embodiments are applicable.

FIG. 10 illustrates an exemplary protocol layer used to support LPP message transfer between an LMF and a UE. An LPP protocol data unit (PDU) may be carried in a NAS PDU between an AMF and the UE.

Referring to FIG. 10, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

2.5.2. NR Positioning Protocol A (NRPPa)

FIG. 11 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

2.6.1. OTDOA (Observed Time Difference of Arrival)

Figure 12:
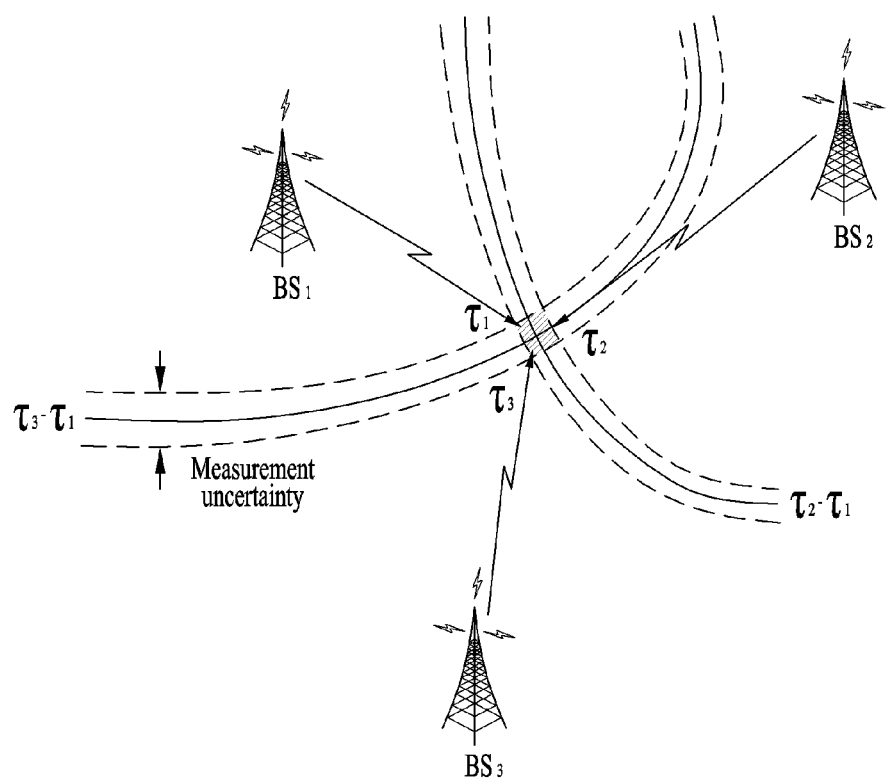
FIG. 12 is a diagram illustrating an observed time difference of arrival (OTDOA) positioning method, to which various embodiments are applicable.

FIG. 12 is a diagram illustrating an observed time difference of arrival (OTDOA) positioning method, to which various embodiments are applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 3 below.

$$RSTDi,1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \quad \text{[Equation 3]}$$

In Equation 3, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i-T_1)$ is a transmission time offset between two TPs, referred to as "real time differences" (RTDs), and $n_i$ and $n_1$ are UE ToA measurement error values.

2.6.2. E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance ($T_{ADV}$), and/or AoA Here, $T_{ADV}$ may be divided into Type 1 and Type 2 as follows.

$T_{ADV}$ Type 1=(ng-eNB Rx-Tx time difference)+(UE E-UTRA Rx-Tx time difference)

$T_{ADV}$ Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

2.6.3. UTDOA (Uplink Time Difference of Arrival)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

2.6.4. Multi RTT (Multi-Cell RTT)

Compared to OTDOA positioning requiring fine synchronization (e.g., at the nano-second level) between TPs in the network, RTT positioning requires only coarse timing TRP (e.g., BS) synchronization although it is based on TOA measurements like OTDOA positioning.

FIG. 13 is a diagram illustrating an exemplary multi-RTT positioning method to which various embodiments of the present disclosure are applicable.

Referring to FIG. 13(a), an RTT process is illustrated, in which an initiating device and a responding device perform TOA measurement, and the responding device provides a TOA measurement to the initiating device, for RTT measurement (calculation). For example, the initiating device may be a TRP and/or a UE, and the responding device may be a UE and/or a TRP.

In operation 1701 according to an exemplary embodiment, the initiating device may transmit an RTT measurement request, and the responding device may receive the RTT measurement request.

In operation 1703 according to an exemplary embodiment, the initiating device may transmit an RTT measurement signal at time to, and the responding device may obtain TOA measurement $t_1$.

In operation 1705 according to an exemplary embodiment, the responding device may transmit an RTT measurement signal at time $t_2$, and the initiating device may obtain TOA measurement $t_3$.

In operation 1707 according to an exemplary embodiment, the responding device may transmit information about $[t_2-t_1]$, and the initiating device may receive the corresponding information and calculate an RTT based on Equation 4 below. The corresponding information may be transmitted and received by a separate signal or in the RTT measurement signal of operation 1705.

$$RTT = t_3 - t_0 - [t_2 - t_1] \quad \text{[Equation 4]}$$

Referring to FIG. 13(b), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered respectively.

3. Various Embodiments of the Present Disclosure

Various embodiments of the present disclosure will be described below in detail based on the above-described technical idea. Clause 1 and clause 2 may be applied to the various embodiments of the present disclosure. For example, operations, functions, and terms which are not defined in the various embodiments of the present disclosure may be performed and described based on clause 1 and clause 2.

Symbol/abbreviations/terms used in the following description of various embodiments of the present disclosure are described below.

A/B/C: A and/or B and/or C
AOA (AoA): angle of arrival
CSI-RS channel state information reference signal
ECID: enhanced cell identifier
GPS: global positioning system
GNSS: global navigation satellite system
LMF: location management function
Max-RSRP RS resource: An RS resource having a maximum RSRP measurement value
Min-ToF RS resource: An RS resource having a minimum ToF/ToA/propagation time
Multi-path (Multiple path): This may mean that a same signal arrives at a receiving side via different paths and/or phase delay (an/or with different paths and/or phase delay).
Network (Network node): This may be a random device playing a role as a (cellular) BS/TP/location server/LMF and/or the same.
NRPPa: NR positioning protocol a
OTDOA (OTDoA): observed time difference of arrival
PRS: positioning reference signal
RAT: radio access technology
RS: Reference signal, e.g., various RSs such as CSI-RS, SSB, PRS, etc.
RTT: round trip time
RSRP: reference signal reception power
RSRQ: Reference signal reception quality, hereinafter, although various embodiments of the present disclosure are mainly described with reference to RSRP, it is a matter of course that various embodiments of the present disclosure may be applied/extended to a case of considering RSRQ and qualities of other Rx signals.
RSTD: reference signal time difference/relative signal time difference
SS: synchronization signal
SSB: synchronization signal block
SS/PBCH: synchronization signal/physical broadcast channel
TDOA (TDoA): timing difference of arrival
TOA (ToA): time of arrival
TRP: transmission reception point (TP: transmission point)
UTDOA (UTDoA): uplink time difference of arrival In the description of various embodiments of the present disclosure, a Base Station (BS) may be understood as a comprehensive term including a Remote Radio Head (RRH), an eNB, a gNB, a TP, a Reception Point (RP), a relay, etc.

In the description of various embodiments of the present disclosure, 'greater than/equal to or greater than A' may be replaced with 'equal to or greater than/greater than A'.

In the description of various embodiments of the present disclosure, 'smaller than/equal to or smaller than B' may be replaced with 'equal to or smaller than/smaller than B'.

In the description of various embodiments of the present disclosure, an RS (e.g., PRS) resource set may include one or more RS resources. For example, the identity of an RS resource set may be defined by an Identifier/index (ID/ index) assigned to the RS resource set. For example, a specific RS resource set may be set in conjunction with a specific cell/TP/BS.

For example, assuming that an RS resource set 1={0, 1, 2, 3} and an RS resource set 2={0, 1, 2, 3} (in this example, an element of a set means an RS resource (Identifier (ID))), as an RS resource (ID) in each set has a same value, an RS resource may not be distinguished by information on the RS resource (ID). Therefore, information on the RS resource set (ID) may be provided together. For another example, when an RS resource may be distinguished from one of an RS resource set (ID) or and RS resource (ID), one of information on the corresponding RS resource set (ID) and information on the RS resource (ID) may be provided.

Various embodiments of the present disclosure may provide a method of configuring a Transmission/Reception (TX/RX) beam of a BS/TP and a UE for effective UE positioning and apparatus for supporting the same.

Various embodiments of the present disclosure may provide a method for solving problems that occur when a TX/RX beam is selected based on a minimum propagation time and apparatus for supporting the same.

Various embodiments of the present disclosure may provide a method for solving problems that may occur when a Transmission (TX) beam having a minimum propagation time is selected and apparatus for supporting the same.

For example, if the overall strength of an RX signal (e.g., RSRP) is too small (e.g., when the strength of the RSRP is equal to or smaller than/smaller than a predetermined threshold), since a noise signal is incorrectly measured as a first arrival signal/first arriving path, it causes a problem that a TX beam having no relation to (irrelevant to) a Line of Signal (LoS) direction is selected. According to various embodiments of the present disclosure, such a problem can be solved.

For example, according to various embodiments of the present disclosure, when different RS resources show the same propagation time, an RS resource selection ambiguity problem can be solved.

For example, as a multi-path delay profile does not change according to a beam, the present situation or problem may occur in case of different beams showing a first path correctly.

In particular, for example, assume that a specific TP transmits an RS with TX beams in several directions for UE positioning. In doing so, for example, among several TX beams used by the same TP, a TX beam of a TP showing a maximum RSRP may be different from a TX beam showing a minimum propagation time. Namely, for example, among multiple RS resource(s) configured to be used for UE positioning (and/or an RS resource set including several RS resources), an RS resource showing a maximum RSRP may be different from an RS resource showing a minimum propagation time. In this case, for example, to determine a TX/RX beam best showing an LoS characteristic between a UE and a specific cell/TP/BS, selection of an RS resource having a smallest propagation time and information on it (e.g., RS resource index) may be reported to a BS/location server/LMF.

For example, although an RS resource is transmitted on a TX beam in a direction different from an LoS signal path direction between a UE and a TP, a corresponding propagation time may be less than a propagation time for a first arrival signal path obtained from an RS resource transmitted on a TX beam closest to the LoS signal path (relatively). For example a UE may measure a first arrival signal path due to noise, and this a propagation time measurement value for the first arrival signal path may become an incorrect value.

Specifically, for example, an RSRP measurement value obtained through an RS resource transmitted/received in a specific TX beam direction may be small (equal to or smaller than a predetermined level/threshold) due to a strong path-loss/penetration loss and the like (equal to or greater than a predetermined level/threshold) between a UE and a cell/TP/BS. In this case, for example, since an overall signal strength of an RX signal is small (equal to or smaller than a predetermined level/threshold), a signal strength/intensity for each signal path among multiple signal paths may be considerably small (equal to or smaller than a predetermined level/threshold) as well. Hence, for example, a signal strength of a first arrival signal path may be similar to a noise signal strength (e.g., a difference between two signal strengths is smaller than a predetermined threshold), and thus a signal corresponding to a first arriving path and a ToF/ToA/propagation time corresponding thereto may be determined not by an actually transmitted/received RS signal but by a noise signal.

A method of distinguishing a noise signal and an actual signal may be taken into consideration in detail.

For example, a strength of a signal for each of multiple signal path(s) of an RS resource transmitted through a specific-direction TX beam of a specific cell/TP/BS is measured, and an actually transmitted signal and a noise signal may be distinguished from each other with reference to a strength of a signal of a specific signal path having a strong (or strongest) signal strength among the multiple signal paths.

For example, there may be a method in which a signal (or a signal peak) exceeding several percent (threshold) of a strength of a strongest signal is recognized not as a noise but as an actually transmitted signal. In this case, for example, if a signal strength (or power) of a signal path having a greatest strength (or power) of an RX signal has a small absolute size, although a signal exceeding several percent with reference to a maximum RX signal strength is regarded not as a noise signal but as an actually received signal, since an absolute size is small, it may become highly probable that a signal path estimated as a first arriving path by a UE is a noise signal rather than an actually transmitted signal.

Figure 14:
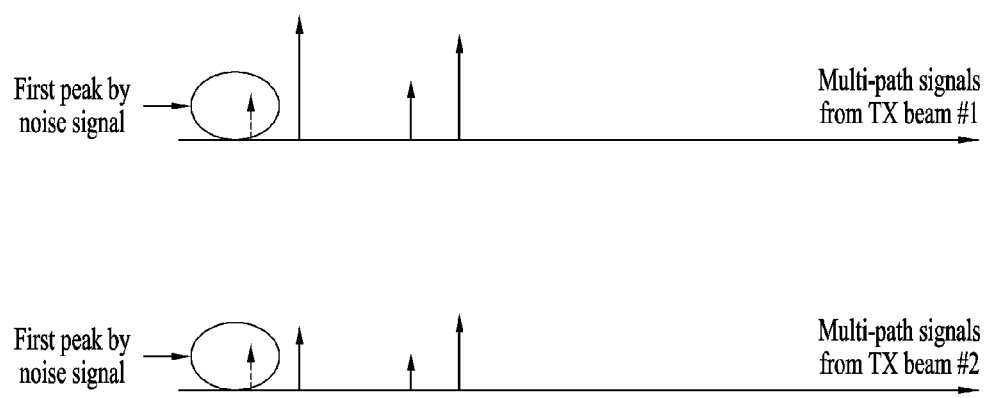
FIG. 14 is a simplified diagram illustrating a method of operating a UE, a transmission and reception point (TRP), a location server, and/or a location management function (LMF) according to various embodiments.

FIG. 14 is a simplified diagram illustrating one example of detecting multiple signal paths having different TX beams to which various embodiments of the present disclosure are applicable.

Referring to FIG. 14, multiple path detection by a specific cell/TP/BS for transmitting an RS with a TX beam #1 by a UE and transmitting an RS with a TX beam #2 by the UE may be considered for the case of the example shown in FIG. 14.

For example, when a cell/TP/BS uses a TX beam directed in a direction considerably different from a direction in which a UE exists (e.g., when a difference between a direction of a UE from a cell/TP/BS and a direction of a TX beam is equal to or greater than a predetermined threshold), a strength of a signal received via several signal paths may be considerably smaller than a strength of a signal transmitted through a TX beam #1 from the perspective of the UE. In this case, as shown in FIG. 14, the UE may incorrectly estimate a first arriving path due to a noise signal.

For example, a single cell/TP/BS may transmit RSs (e.g., PRSs) with beams of several directions. In this case, a UE intending to obtain measurement (e.g., RSTD measurement) may need to select an RS corresponding to Line of Sight (LoS) from the RSs received from the single cell/TP/BS based on several directions. In this case, for example, the UE may select the RS based on ToF/ToA/propagation time.

Yet, for example, since a channel environment between a UE and a cell/TP/BS is poor, if a signal strength of an RS is not good overall (e.g., if a signal strength is equal to or smaller than a predetermined threshold overall), the RS may not be distinguished from noise. In this case, if an RS for measurement obtainment is selected based on ToF/ToA/propagation time only, it may be inaccurate.

Various embodiments of the present disclosure may be related to further considering a signal quality (e.g., SNR/SINR/RSRP/RSRQ, etc.) in addition to ToF/ToA/propagation time in selecting an RS for measurement obtainment by a UE.

Figure 15:
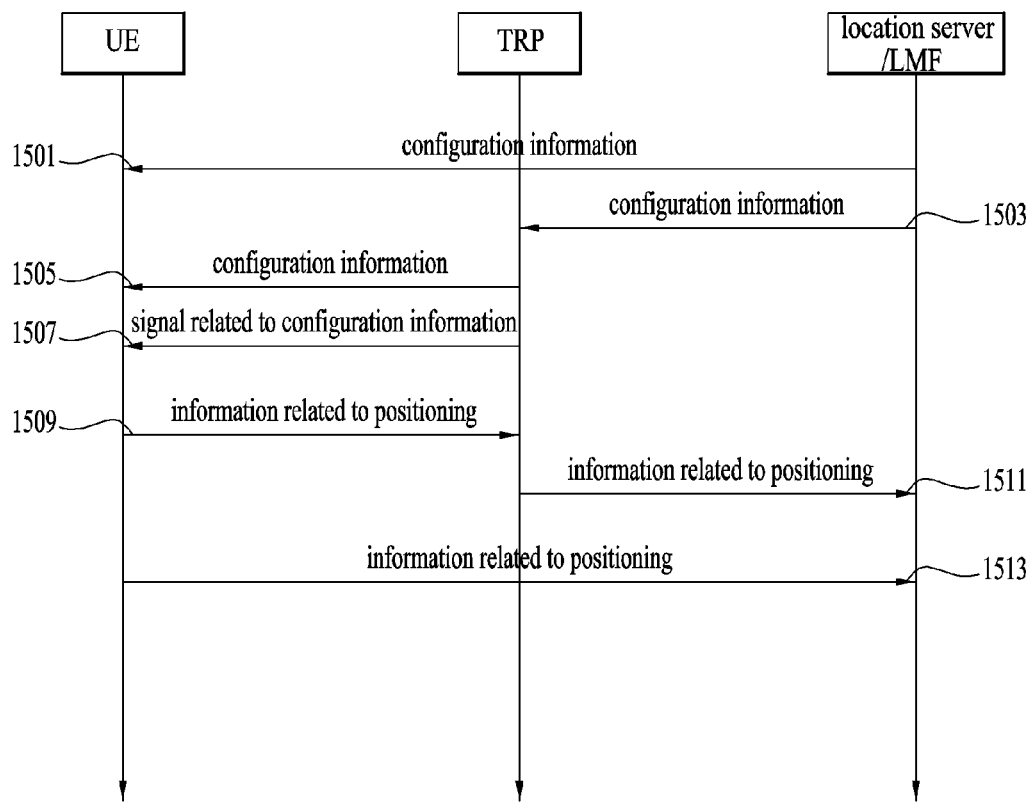
FIG. 15 is a simplified diagram illustrating a method of operating a UE, a TRP, a location server, and/or an LMF according to various embodiments.

FIG. 15 is a diagram schematically illustrating a method of operating a UE, a TRP, a location server, and/or an LMF according to various embodiments.

Referring to FIG. 15, in an operation 1501 according to an exemplary embodiment, a location server and/or LMF may transmit configuration information to a UE and the UE may receive it.

Meanwhile, in an operation 1503 according to the exemplary embodiment, the location server and/or LMF may transmit reference configuration information to a Transmission and Reception Point (TRP) and the TRP may receive it. In an operation 1505 according to the exemplary embodiment, the TRP may transmit the reference configuration information to the UE and the UE may receive it. IN this case, the operation 1501 according to the exemplary embodiment may be skipped.

On the contrary, the operations 1503 and 1505 according to the exemplary embodiment may be skipped. In this case, the operation 1501 according to the exemplary embodiment may be performed.

Namely, the operation 1501 according to the exemplary embodiment and the operations 1503 and 1505 according to the exemplary embodiment may be optional.

In an operation 1507 according to the exemplary embodiment, the TRP may transmit a signal related to the configuration information to the UE and the UE may receive it. For example, the signal related to the configuration information may be a signal for positioning of the UE.

In an operation 1509 according to the exemplary embodiment, the UE may transmit a signal related to positioning to the TRP and the TRP may receive it. In an operation 20111 according to the exemplary embodiment, the TRP may transmit the signal related to the positioning to the location server and/or LMF and the location server and/or LMF may receive it.

Meanwhile, in an operation 1513 according to the exemplary embodiment, the UE may transmit a signal related to positioning to the location server and/or LMF and the location server and/or LMF may receive it. In this case, the operations 1509 and 1511 according to the exemplary embodiment may be skipped.

On the contrary, the operations 1513 according to the exemplary embodiment may be skipped. In this case, the operations 1511 and 1513 according to the exemplary embodiment may be performed.

Namely, the operations 1509 and 1511 according to the exemplary embodiment and the operation 1513 according to the exemplary embodiment may be optional.

In the exemplary embodiment, a signal related to positioning may be obtained based on configuration information and/or a signal related to the configuration information.

Figure 16:
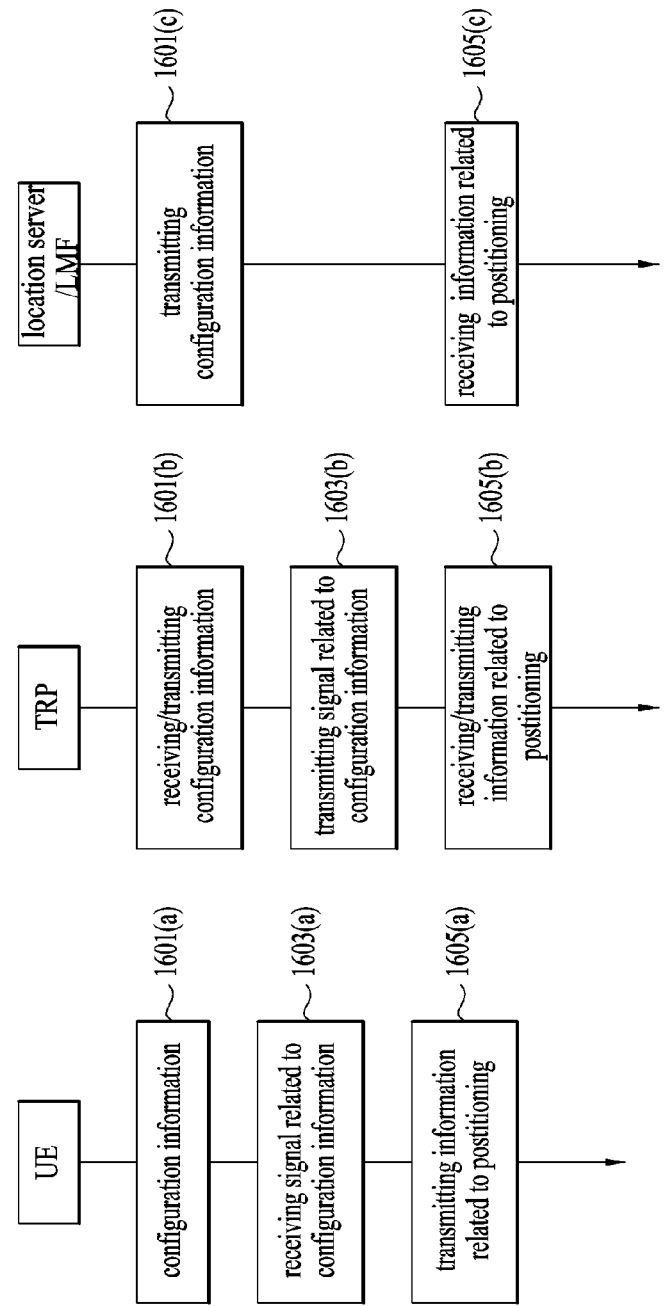
FIG. 16 is a diagram schematically illustrating a method of operating a UE, a TRP, and a location server and/or LMF according to various embodiments of the present disclosure.

FIG. 16 is a diagram schematically illustrating a method of operating a UE, a TRP, and a location server and/or LMF according to various embodiments of the present disclosure.

Referring to FIG. 16(a), in an operation 1601(a) according to an exemplary embodiment, a UE may receive configuration information.

In an operation 1603(a) according to the exemplary embodiment, the UE may receive a signal related to the configuration information.

In an operation 1605(a) according to the exemplary embodiment, the UE may transmit information related to positioning.

Referring to FIG. 16(b), in an operation 1601(b) according to the exemplary embodiment, a TRP may receive configuration information from a location server and/or LMF and transmit it to the UE.

In an operation 1603(b) according to the exemplary embodiment, the TRP may transmit a signal related to configuration information.

In an operation 1605(b) according to the exemplary embodiment, the TRP may receive information related to positioning and transmit it to the location server and/or LMF.

Referring to FIG. 16(c), in an operation 1601(c) according to the exemplary embodiment, the location server and/or LMF may transmit configuration information.

In an operation 1603(c) according to the exemplary embodiment, the location server and/or LMF may receive information related to positioning.

For example, the above-described configuration information may be understood as related to reference configuration (information), one or more informations transmitted to or configured for the UE by the location server and/or LMF or the TRP and the like in the following description of various embodiments of the present disclosure, and/or as including the corresponding reference configuration (information), one or more informations transmitted to or configured for the UE by the location server and/or LMF or the TRP and the like For example, the signal related to the positioning may be understood as a signal related to one or more of informations reported by a UE in the following description of various embodiments of the present disclosure and or a signal including one or more of informations reported by the corresponding UE.

For example, in the following description of various embodiments of the present disclosure, a Base Station (BS), a gNB, a cell, or the like may be substituted with a TRP, a TP, a random device playing a role of the same, or the like.

For example, in the following description of various embodiments of the present disclosure, a location server may be substituted with an LMF, a random device playing a role of the same, or the like.

More specific operations, functions, terms, and the like in the operation according to each exemplary embodiment may be performed and described based on various embodiments of the present disclosure described in the following. Meanwhile, operations according to each exemplary embodiment are exemplary, and one or more operations of the above-described operations may be omitted according to specific contents of each embodiment.

Hereinafter, various embodiments of the present disclosure will be described in detail. All or some of the various embodiments of the present disclosure to be described below may be combined to form other various embodiments of the present disclosure unless mutually excluded, which may be clearly understood by those skilled in the art to which the present disclosure pertains.

3.1. Proposal #1—RS Resource Selection and Reporting Considering Propagation Time and Signal Strength According to various embodiments of the present disclosure, a method of selecting and/or reporting an RS resource based on propagation time and/or signal strength and apparatus for supporting the same may be provided.

UE RX-TX Time Difference/Propagation Time

For example, a UE may receive configuration of multiple RS resources, which are transmitted by a specific cell/TP/BS, from an LMF/location server/BS.

For example, the UE may be configured/instructed to report "UE RX-TX time difference measurement"/"propagation time measurement" and/or specific RS resource information (RS resource ID/index/indicator, etc.) for a specific RS resource among RS resources to the LMF/location server/BS.

RSTD Measurement

For example, a UE may receive configuration of multiple RS resources, which are transmitted by a specific cell/TP/BS, from an LMF/location server/BS.

For example, the UE may be configured/instructed to select a specific RS resource from RS resources transmitted by each cell/TP/BS and report RSTD measurement between RS resources selected for a different cell/TP/BS and/or specific RS resource information (RS resource ID/index/indicator, etc.) for each cell/TP/BS to the LMF/location server/B S.

For example, among multiple RS resources, an RS resource having a maximum RSRP measurement value may be different from an RS resource having a minimum propagation time. For example, as a method of selecting one or more (P)RS resources from multiple (P)RS resources transmitted by a specific cell/TP/BS for UE TX-RX time different measurement/propagation time measurement/RSTD measurement obtainment, one or more of the following methods may be considered.

Option 1: Max RSRP Consideration

For example, as only RS resources, each of which indicates an RSRP measurement value equal to or greater than X % (where X>0) of maximum RSRP/SNR (signal-to-noise ratio)/SINR (signal-to-interference plus noise ratio) (max-RSRP) among RSRP/SNR (signal-to-noise ratio)/SINR (signal-to-interference plus noise ratio) values obtained through multiple RS resources transmitted from a specific cell/TP/BS, are considered as candidates (e.g., candidates for measurement and/or reporting), an RS resource having a minimum propagation time of a first arrival signal path may be selected/sorted from them and/or M RS resources (where M≥1) having a minimum propagation time of the first arrival signal path may be selected/sorted from them.

Option 2: Consideration with Fallback Mode

For example, propagation time measurement of each of multiple RS resources transmitted from a specific cell/TP/BS is obtained, and an RS resource indicating a minimum propagation time may be selected.

(Option 2-1): For example, if an RSRP value of a selected RS resource exceeds X percent (%) of a maximum RSRP value obtained through multiple RS resources transmitted from a specific cell/TP/BS, the RS resource may be selected as a min-ToF RS resource and used for UE measurement obtainment and/or reporting. For example, if not exceeding X percent, a UE (in fallback mode and/or by default mode, etc.) may select an RS resource having a maximum RSRP as an RS resource to be used for UE positioning and use it for UE measurement obtainment and/or reporting. For example, X may be configured/commanded as a real number greater than 0.

(Option 2-2): For example, if an RSRP value of a selected RS resource exceeds an average value of RSRP values obtained through multiple RS resources transmitted from a specific cell/TP/BS (and/or a value corresponding to upper/lower X (>0) percent (%) of RSRP values obtained through multiple RS resources), the RS resource may be selected as an RS resource for UE positioning and used for UE measurement obtainment and/or reporting. For example, if not exceeding, a UE (in fallback mode and/or by default mode, etc.) may select an RS resource having a maximum RSRP as a min-ToF RS resource and use it for UE measurement obtainment and/or reporting.

(Option 2-3): For example, if an RSRP value of a selected RS resource exceeds a specific threshold value (e.g., a threshold value for SNR/SINR/RSRP/RSRQ, etc. for SNR/SINR/RSRP/RSRQ, etc.) configured/commanded by a BS, the RS resource may be selected as an RS resource for UE positioning and used for UE measurement obtainment and/or reporting. For example, if not exceeding, a UE (in fallback mode and/or by default mode, etc.) may select an RS resource having a maximum RSRP as a min-ToF RS resource and use it for UE measurement obtainment and/or reporting.

For example, X in the X (>0) % value of Option 2 may be configured for or commanded to the UE by the LMF/location server/BS.

For example, in Option 2, "select as an RS resource to use (or be used) for UE positioning" may be construed as follows. Namely, when an LMF/location server/BS instructs a UE to obtain UE measurement such as UE TX-RX time difference measurement, propagation time measurement, RSTD and the like by selecting an RS corresponding to a minimum propagation time, the UE regards an RS resource having a maximum RSRP as an RS resource indicating a minimum propagation time despite that the RS resource having the maximum RSRP does not have a minimum propagation time measurement, and utilizes it for UE measurement obtainment and reporting. In addition, for example, when reporting RS resource information (e.g., RS resource ID/index/indicator, etc.) indicating a minimum propagation time, a UE may report RS resource information indicating a maximum RSRP instead.

Option 3: Based on Upper X %

For example, only RS resources, each of which has an RSRP/SNR/SINR measurement value equal to or greater than upper X (>0) % of a maximum RSRP/SNR/SINR measurement value among RSRP/SNR/SINR values obtained through multiple RS resources transmitted from a specific cell/TP/BS, are considered as candidate RS resources. An RS resource having a minimum propagation time of a first arrival signal path may be selected/sorted from the candidate RS resources and/or M 1) RS resources having a minimum propagation time of a first arrival signal path may be selected/sorted from the candidate RS resources.

For example, X % of Option 3 may be configured/commanded from an LMF/location server/BS. For example, X may be configured/commanded as a real number exceeding 0.

Option 4: Based on Upper M

For example, only M (≥1) RS resources, each of which has a maximum RSRP/SNR/SINR measurement value among RSRP/SNR/SINR values obtained through multiple RS resources transmitted from a specific cell/TP/BS, are considered as candidate RS resources. An RS resource having a minimum propagation time of a first arrival signal path may be selected/sorted from the candidate RS resources. For example, M may be a natural number.

For example, X and/or M mentioned in Options 1 to 4 may be commanded to or configured for the UE by the LMF/location server/BS. Specifically, for example, the LMF/location server/BS may configure several candidate values instead of a single value and configure/instruct the UE to use a specific value among the candidate values.

Option 5: Absolute Threshold

For example, an LMF/location server/BS may configure/command a specific threshold value (e.g., a threshold value for RSRP/SNR/SINR, etc.) to a UE.

For example, a threshold value is a value to be compared with an RSRP value obtained for each RS resource by a UE. Only an RS resource having an RSRP measurement value greater than (or smaller than) a threshold value may be considered as a candidate RS resource (by the UE).

Alternatively, for example, a threshold value is a value to be compared with an SNR/SINR value obtained for each RS resource by a UE. Only an RS resource having an SNR/SINR measurement value smaller/greater than a threshold value may be considered as a candidate RS resource (by the UE).

For example, a UE may select/sort an RS having a minimum propagation time among candidate RS resources and/or may select/sort M (>1) RS resources having a smallest propagation time of a first arrival signal path among the candidate RS resources.

Option 6: Consideration of Two Minimum Propagation Time Measurement Difference

For example, if a propagation time (minimum propagation time) measured on a first arrival signal path transmitted via a specific RS resource is (most) smaller than a propagation time obtained from another RS resource but a difference between the minimum propagation time and the propagation time obtained from another RS resource is greater than a specific threshold value, a UE may regard the propagation time as not valid for a minimum value and exclude it from candidate RS resources for measurement and/or reporting.

According to various embodiments of the present disclosure, it may help a UE avoid measuring a noise signal as a first arriving path of a received reference signal incorrectly.

Figure 17:
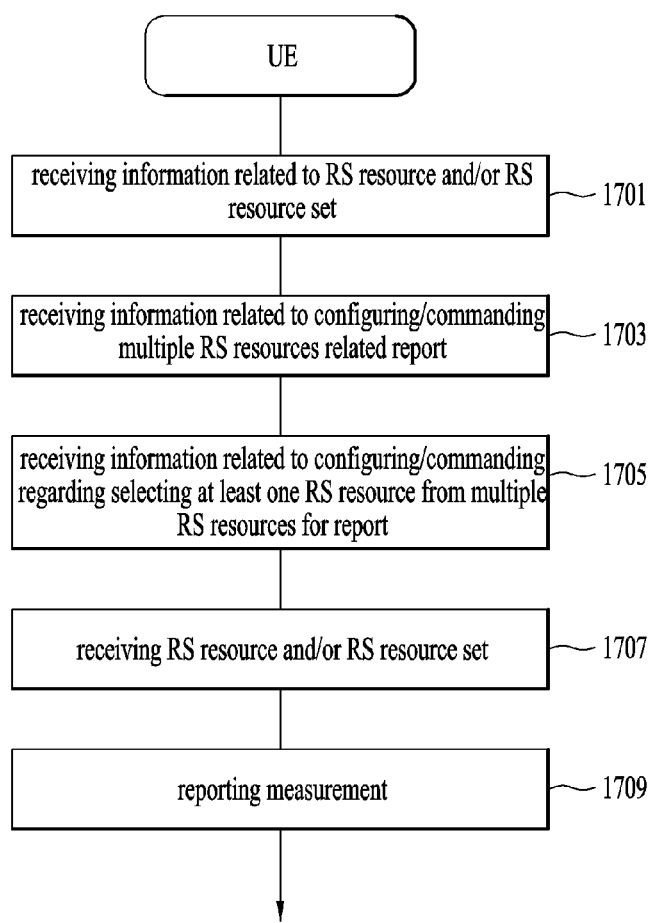
FIG. 17 is a flowchart illustrating a method of operating a UE according to various embodiments of the present disclosure.

FIG. 17 is a flowchart illustrating a method of operating a UE according to various embodiments of the present disclosure.

FIG. 17 may be a flowchart illustrating one example of a method of operating a UE in Proposal #1 according to various embodiments of the present disclosure.

In FIG. 17, each operation may be performed simultaneously and/or independently. In addition, the order of each operation may be changed entirely or in part.

Referring to FIG. 17, in an operation 1701 according to an exemplary embodiment, a UE may receive information related to an RS resource and/or an RS resource set.

For example, the UE may receive an RS resource and/or RS resource information usable for UE positioning from an LMF/location server/BS. For example, the UE may receive the corresponding information as a part of assistance data (e.g., assistance data defined in TS 36.355 and the like may be usable) from the LMF/location server/BS.

In an operation 1703 according to the exemplary embodiment, the UE may receive information configuring/commanding a report related to multiple RSs.

For example, the UE may be configured/instructed to report UE RX-TX time difference/propagation time/RSTD measurement of multiple RS resources by the LMF/location server/B S.

In an operation 1705 according to the exemplary embodiment, the UE may receive information configuring/commanding to select one or more RSs for reporting from multiple RS resources.

For example, the UE may be configured/instructed to report/obtain UE RX-TX time difference/propagation time/RSTD measurement in a manner of separating RS resources showing RSRP/SNR/SINR over a specific level from multiple RS resources transmitted by each cell/TP/BS and selecting an RS resource showing a minimum propagation time from the separated RS resources. For example, the UE may be configured/instructed by the LMF/location server/B S.

In an operation 1707 according to the exemplary embodiment, the UE may receive an RS resource and/or an RS resource set.

For example, the UE may receive an RS resource and/or an RS resource set from the cell/TP/BS.

In an operation 1709 according to the exemplary embodiment, the UE may report the measurement.

For example, the UE may obtain the configured/commanded UE RX-TX time difference/propagation time/RSTD measurement. For example, the RS resource and/or the RS resource set may be used for the measurement obtainment. For example, the UE may report the UE RX-TX time difference/propagation time/RSTD measurement to the LMF/location server/B S.

Figure 18:
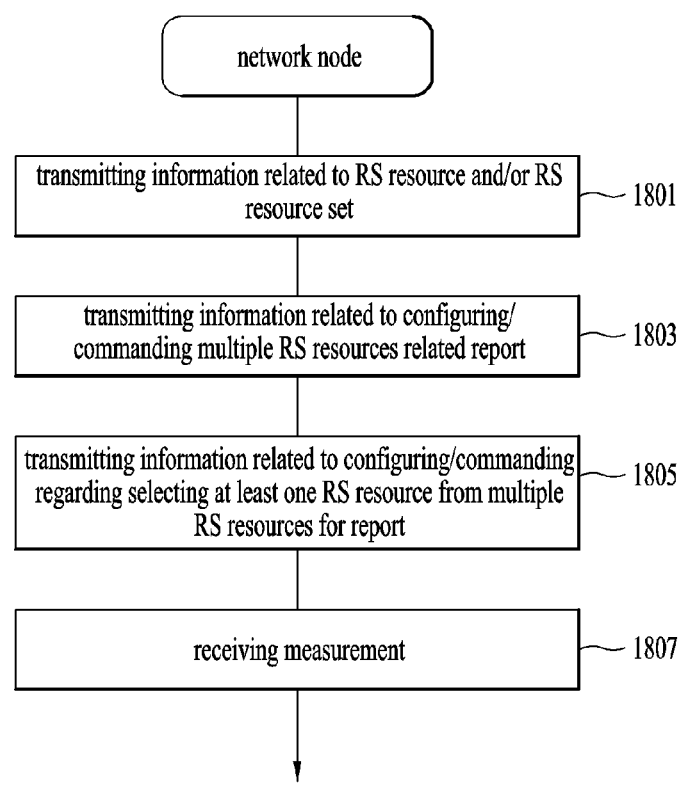
FIG. 18 is a flowchart illustrating a method of operating a network node according to various embodiments of the present disclosure.

FIG. 18 is a flowchart illustrating a method of operating a network node according to various embodiments of the present disclosure. For example, the network node may include a location server and/or an LMF and/or a BS and/or a random device performing the same job.

FIG. 18 may be a flowchart illustrating one example of a method of operating an LMF/location server/BS in Proposal #1 according to various embodiments of the present disclosure.

In FIG. 18, each operation may be performed simultaneously and/or independently. In addition, the order of each operation may be changed entirely or in part.

Referring to FIG. 18, in an operation 1801 according to an exemplary embodiment, an LMF/location server/BS may transmit information related to an RS resource and/or an RS resource set.

For example, the LMF/location server/BS may transmit an RS resource and/or RS resource information usable for UE positioning to a UE. For example, the LMF/location server/BS may transmit the corresponding information as a part of assistance data (e.g., assistance data defined in TS 36.355, etc.) to the UE.

In an operation 1803 according to the exemplary embodiment, the LMF/location server/BS may transmit information configuring/commanding a report related to multiple RSs.

For example, the LMF/location server/BS may configure/instruct the UE to report UE RX-TX time difference/propagation time/RSTD measurement of multiple RS resources.

In an operation 1805 according to the exemplary embodiment, the LMF/location server/BS may transmit information for configuring/commanding to select one or more RSs for reporting from multiple RS resources.

For example, the LMF/location server/BS may configure/instruct the UE to report/obtain UE RX-TX time difference/propagation time/RSTD measurement in a manner of separating RS resources showing RSRP/SNR/SINR over a specific level from multiple RS resources transmitted by each cell/TP/BS and selecting an RS resource showing a minimum propagation time from the separated RS resources.

In an operation 1807 according to the exemplary embodiment, the LMF/location server/BS may receive measurement.

For example, a cell/TP/BS may transmit an RS resource and/or an RS resource set, and the UE may receive it. For example, the LMF/location server/BS may receive a report of UE RX-TX time difference/propagation time/RSTD measurement from the UE. For example, the UE RX-TX time difference/propagation time/RSTD measurement may be obtained using the RS resource and/or the RS resource set.

3.2. Proposal #2—RS Resource Selection and Reporting for the Same Propagation Time Measurements Between Different RS Resources For example, a cell/TP/BS may use TX beams in various directions. Yet, for example, although TX beam directions are different, since a fading environment (e.g., surrounding buildings, etc.) between the cell/TP/BS and a UE does not change, a multi-path delay profile between the cell/TP/BS and the UE may not change. Yet, for example, a strength of an RX signal of a specific signal path (signal tap) may vary depending on a TX/RX beam used by the cell/TP/BS and UE. Namely, for example, when the UE and/or the cell/TP/BS measures a first arriving path of an RX signal, since a first arriving path is determined for a signal strength exceeding a specific level/threshold only, the measured/determined first arriving path may change depending on a TX/RX beam.

Therefore, considering this, for example, although a combination of TX/RX beams between the cell/TP/BS and the UE is different, if a signal strength of a first arrival signal path is sufficiently higher than a specific level/threshold, the same first arrival signal path may be measured. Namely, for example, when an RS resource having a minimum propagation time is selected from multiple configured/commanded RS resources (e.g., PRS resources), a plurality of RS resources (i.e., one or more RS resources) may be selected. And, a situation in which RS resource index information the UE should report is not clear may occur.

According to various embodiments of the present disclosure, a method for reporting different RS resources corresponding to the same propagation time measurement and apparatus for supporting the same may be provided.

In the description of various embodiments of the present disclosure, the meaning of being the same may include the same or similar. For example, the meaning of 'A is equal to B (and/or A and B are the same)' may include the meaning of 'A is similar to B (and/or A and B are similar). For example, if A is similar to B, A may be determined as equal to B (and/or A and B are the same).

In the description of various embodiments of the present disclosure, the meaning that A is similar to B (and/or that A and B are similar) may mean that a difference between A and B is smaller than or equal to a specific threshold value. For example, the threshold value may be predetermined and/or configured/commanded from a network.

A propagation time/ToA measurement value for a first arrival signal path obtained for multiple RS resources transmitted from the same cell/TP/BS may be similar. For example, when there are two or more PRS resources having a similar propagation time/ToA measurement value obtained for a first arrival signal path of each RS resource, an operation of an LMF/location server/BS or a UE described later may be considered. (e.g., one or more of Options 1 to 4 in the following may be considered.) For example, the meaning of 'a propagation time/ToA measurement value is similar' may mean that a difference between two propagation time/ToA values is equal to or smaller than a specific threshold value. For example, the specific threshold value may be pre-determined and/or configured/commanded from a network.

For example, a UE may receive configuration of one or multiple RS resources (e.g., various DL RSs such as PRS, CSI-RS, SSB, etc.) usable for UE positioning from an LMF/location server/BS.

For example, an LMF/location server/BS may configure/instruct a UE to obtain UE RX-TX time difference measurement/propagation time measurement/RSTD measurement/ToA measurement or report them to the LMF/location server/BS by selecting and/or using an RS resource having a smallest propagation time measurement (e.g., propagation time measurement of a first arriving path) obtained using each RS resource among RS resources (e.g., each RS resource may mean an RS transmitted on a specific TX beam). In this case, for example, when there are two or more RS resources having the same UE RX-TX time difference measurement value/propagation time measurement value/RSTD measurement value/ToA measurement value obtained for a first arrival signal path of each RS resource among multiple RS resources transmitted from the same cell/TP/BS, operations of the LMF/location server/BS and/or the UE may be proposed as follows.

Option. 1)

For example, a UE may select one or multiple RS resources having a smallest propagation time from one or multiple RS resources transmitted from a same cell/TP/BS, select one RS resource having a greatest RX signal strength value of RSRP/SNR/SINR, etc. among the selected RS resource(s), obtain a commanded UE measurement, and/or report the measurement to an LMF/location server/BS. For example, the UE may be configured/instructed by the LMF/location server/BS to perform such an operation of the UE. This may be construed as follows. For example, when a specific RS resource is selected, a high priority is given to a propagation time measurement value, and for a resource having the same value, a signal strength of RSRP/SNR/SINR, etc. is considered as a next priority.

For example, the commanded UE measurement may include UE RX-TX time difference/propagation time/RSTD measurement.

Effects: For example, according to the embodiment corresponding to the above-described option, when there are several RS resources having the minimum propagation time, ambiguity of UE operation can be eliminated, and regarding RS resources having the same propagation time, an RS resource having a stronger signal strength is selected, thereby improving UE positioning accuracy.

Option. 2)

For example, a UE may be configured/instructed by an LMF/location server/BS to select one or multiple RS resources having a smallest propagation time from one or multiple RS resources transmitted from a same cell/TP/BS and report M (>1) RS resource informations (e.g., RS resource ID/index/indicator, etc.) having a greatest RX signal strength value of RSRP/SNR/SINR, etc. among the selected RS resource(s) to the LMF/location server/BS.

Effect: For example, an RS resource TX beam angle (AoD: angle of departure) of a cell/TP/BS and an RSRP value per TX beam of a UE may be utilized for (fingerprint-based) UE positioning. Namely, for example, beams in several directions of transmission by a specific cell/TP/BS at a same location and/or RSRP for each beam are stored in advance with respect to a specific location, and the stored information may be utilized in estimating a location of a UE.

Option. 3)

For example, a UE may select one or multiple RS resources having a smallest propagation time from one or multiple RS resources transmitted from a same cell/TP/BS. If there are one or more multiple RS resources having the same minimum propagation time, the UE may select and/or report a random RS among the RS resources and may obtain/calculate and/or report a commanded measurement. For example, the UE may be configured/instructed by an LMF/location server/BS to perform such an operation of the UE.

Option. 4)

For example, a UE may select one or multiple RS resources having a smallest propagation time from one or multiple RS resources transmitted from a same cell/TP/BS. If there are one or more multiple RS resources having the same minimum propagation time, the UE may select an RS resource having a smallest or greatest RS resource ID/index/indicator, etc. from the RS resources showing the minimum propagation time and/or repot the RS resource information (e.g., RS resource ID, scrambling sequence ID, etc.), and may obtain/calculate and/or report the commanded measurement. For example, the UE may be configured/instructed by an LMF/location server/BS to perform such an operation of the UE.

Effect of Option. 3/4: For example, according to an embodiment corresponding to Option 3 or Option 4, when there are several RS resources having the minimum propagation time, ambiguity for an operation of reporting an RS resource by a UE can be eliminated.

In the description of the present section and various embodiments of the present disclosure, the propagation time/ToA/ToF, etc. may all be for a first arriving path among transmitted multiple paths.

3.2. Proposal #3—Proposal #1+Proposal #2

According to various embodiments of the present disclosure, Proposal #1 and Proposal #2 may be applied/applied and/or extended together.

That is, at least some of the embodiments described in Proposition #1 according to various embodiments of the present disclosure and at least some of the embodiments described in Proposition #2 may be combined to configure other various embodiments of the present disclosure.

For example, Option 4 of Proposal #1 and Option 4 of Proposal #2 may be considered together.

Specifically, for example, an LMF/location server/BS may configure/instruct a UE to report M (>1) RS resources having greatest RSRP among one or multiple RS resources transmitted from a specific cell/TP/BS. In this case, for example, if there are two or more RS resources showing a minimum propagation time, the LMF/location server/BS may consider configuring/instructing the UE to report an RS resource having a smallest RS resource ID among the RS resources to the LMF/location server/BS.

Figure 19:
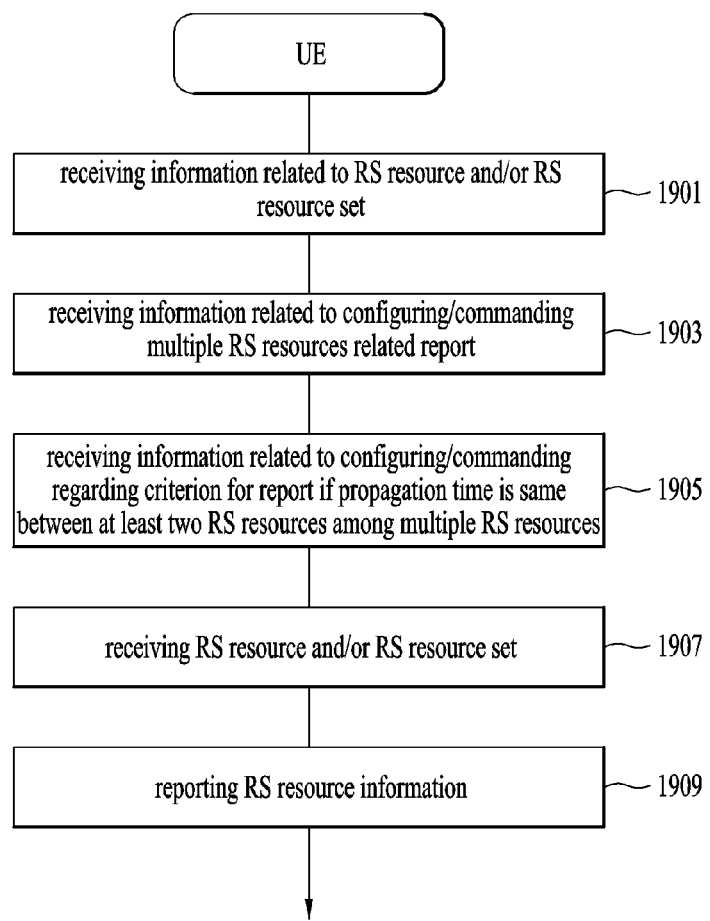
FIG. 19 is a flowchart illustrating a method of operating a UE according to various embodiments of the present disclosure.

FIG. 19 is a flowchart illustrating a method of operating a UE according to various embodiments of the present disclosure.

FIG. 19 may be a flowchart illustrating one example of a method of operating a UE in Proposal #2 according to various embodiments of the present disclosure.

In FIG. 19, each operation may be performed simultaneously and/or independently. In addition, the order of each operation may be changed entirely or in part.

Referring to FIG. 19, in an operation 1901 according to an exemplary embodiment, a UE may receive information related to an RS resource and/or an RS resource set.

For example, the UE may receive an RS resource and/or RS resource information usable for UE positioning from an LMF/location server/BS. For example, the UE may receive the corresponding information as a part of assistance data (e.g., assistance data defined in TS 36.355, etc.) from the LMF/location server/BS.

In an operation 1903 according to the exemplary embodiment, the UE may receive information configuring/commanding a report related to multiple RSs.

For example, the UE may be configured/instructed by the LMF/location server/BS to report UE RX-TX time difference/propagation time/RSTD measurement of multiple RS resources.

In an operation 1905 according to the exemplary embodiment, the UE may receive information related to configuring/commanding a reference for reporting in case that at least two of multiple RS resources have the same propagation time.

For example, the UE may be configured/instructed to report/obtain RS resource information (e.g., RS resource ID) showing a minimum propagation time among multiple RS resources transmitted from each cell/TP/BS and report/obtain RS resource information having a greatest signal strength of RSRP/SNR/SINR, etc. in case of the same minimum propagation time (i.e., in case that two or more RS resources having the minimum propagation time exist among the multiple RS resources). For example, the UE may be configured/instructed by the LMF/location server/BS.

In an operation 1907 according to the exemplary embodiment, the UE may receive an RS resource and/or an RS resource set.

For example, the UE may receive an RS resource and/or an RS resource set from the cell/TP/BS.

In an operation 1909 according to the exemplary embodiment, the UE may report RS resource information.

For example, the UE may repot the RS resource information by selecting a specific RS resource from multiple RS resources. For example, the UE may report the RS resource information to the LMF/location server/BS.

Figure 20:
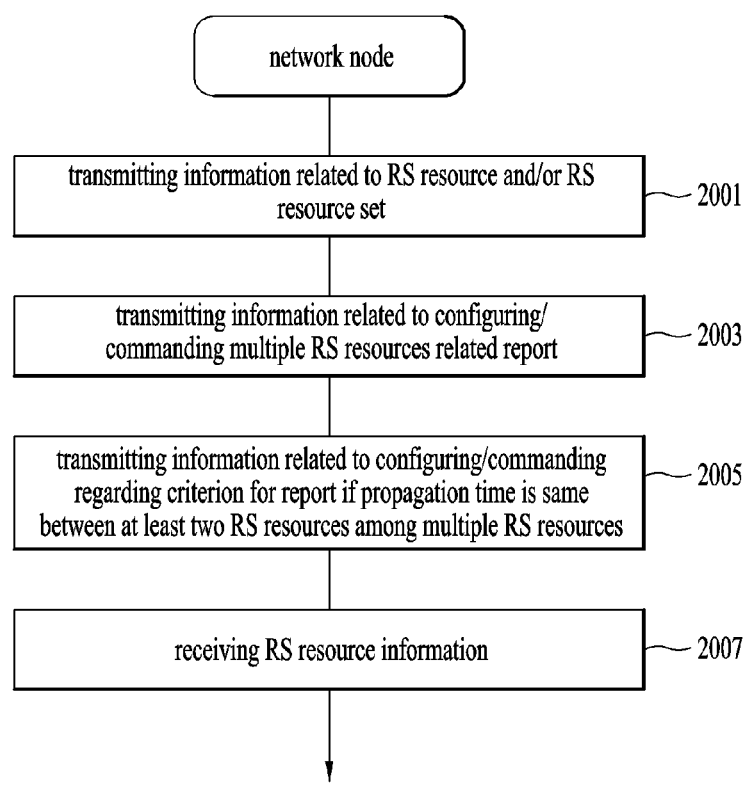
FIG. 20 is a flowchart illustrating a method of operating a network node according to various embodiments of the present disclosure.

FIG. 20 is a flowchart illustrating a method of operating a network node according to various embodiments of the present disclosure. For example, the network node may include a location server and/or an LMF and/or a BS and/or a random device performing the same job.

FIG. 20 may be a flowchart illustrating one example of a method of operating an LMF/location server/BS in Proposal #2 according to various embodiments of the present disclosure.

In FIG. 20, each operation may be performed simultaneously and/or independently. In addition, the order of each operation may be changed entirely or in part.

In an operation 2001 according to an exemplary embodiment, an LMF/location server/BS may transmit information related to an RS resource and/or an RS resource set.

For example, the LMF/location server/BS may transmit an RS resource and/or RS resource information usable for UE positioning to a UE. For example, the LMF/location server/BS may transmit the corresponding information as a part of assistance data (e.g., assistance data defined in TS 36.355, etc.) to the UE.

In an operation 2003 according to the exemplary embodiment, the LMF/location server/BS may receive information configuring/commanding a report related to multiple RSs.

For example, the LMF/location server/BS may configure/instruct the UE to report UE RX-TX time difference/propagation time/RSTD measurement of multiple RS resources.

In an operation 2005 according to the exemplary embodiment, the LMF/location server/BS may transmit information related to configuring/commanding a reference for reporting in case that at least two of multiple RS resources have the same propagation time.

For example, the LMF/location server/BS may configure/instruct the UE to report/obtain RS resource information (e.g., RS resource ID) showing a minimum propagation time among multiple RS resources transmitted from each cell/TP/BS and report/obtain RS resource information having a greatest signal strength of RSRP/SNR/SINR, etc. in case of the same minimum propagation time (i.e., in case that two or more RS resources having the minimum propagation time exist among the multiple RS resources).

In an operation 2007 according to the exemplary embodiment, the LMF/location server/BS may receive RS resource information.

For example, the cell/TP/BS may transmit an RS resource and/or an RS resource set and the UE may receive it. For example, the LMF/location server/BS may receive a report of RS resource information (e.g., RS resource ID) from the UE. For example, the RS resource information may relate to a specific RS resource selected from multiple RS resources.

Figure 21:
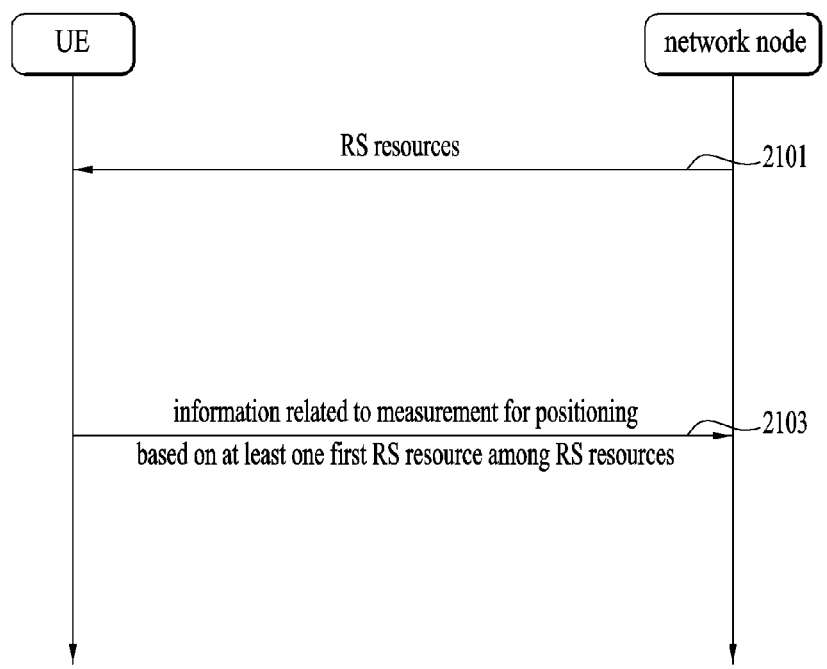
FIG. 21 is a diagram schematically illustrating a method of operating a UE and network nodes according to various embodiments of the present disclosure.

FIG. 21 is a diagram schematically illustrating a method of operating a UE and network nodes according to various embodiments of the present disclosure.

Figure 22:
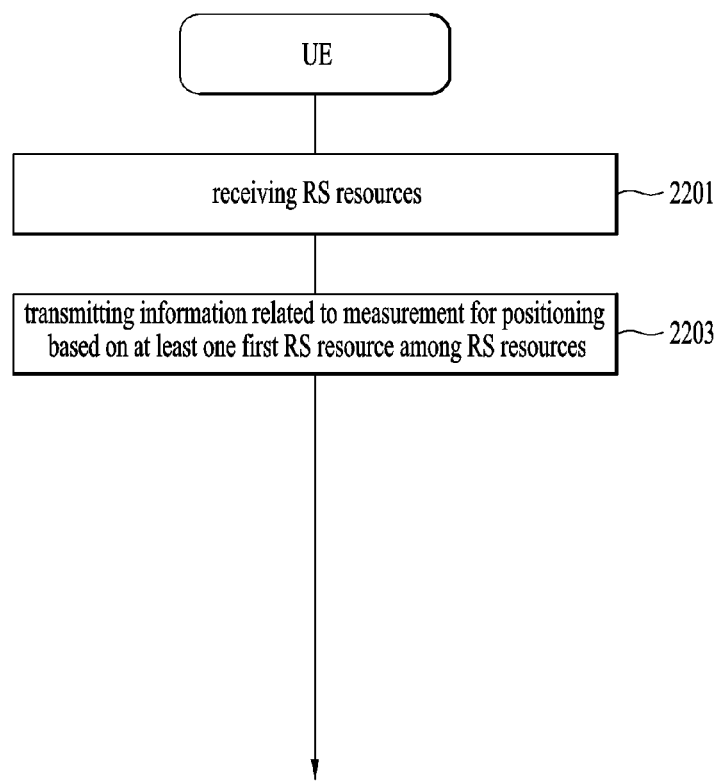
FIG. 22 is a flowchart illustrating a method of operating a UE according to various embodiments of the present disclosure.

FIG. 22 is a flowchart illustrating a method of operating a UE according to various embodiments of the present disclosure.

Figure 23:
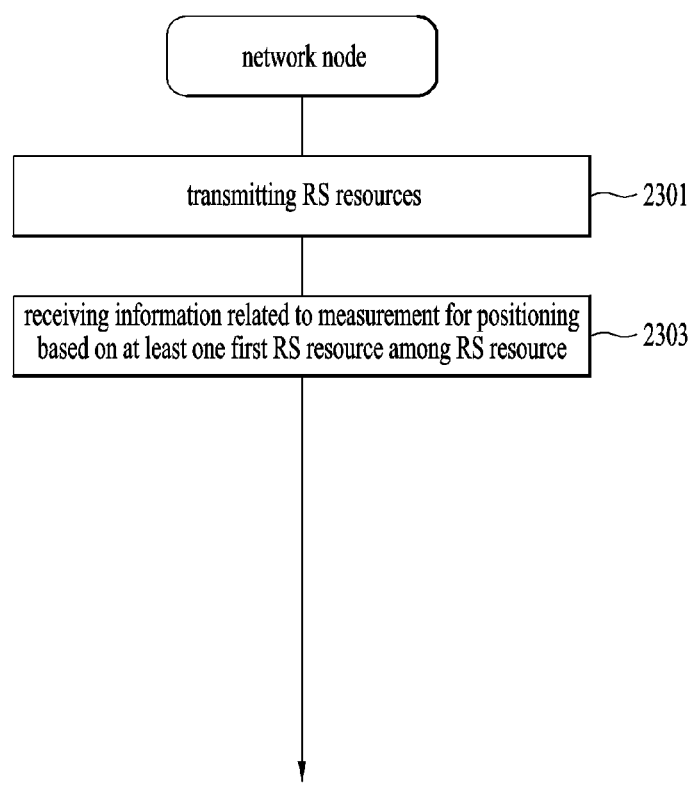
FIG. 23 is a flowchart illustrating a method of operating a network node according to various embodiments of the present disclosure.

FIG. 23 is a flowchart illustrating a method of operating a network node according to various embodiments of the present disclosure. For example, the network node may include a location server and/or an LMF and/or a BS and/or a random device performing the same job.

Referring to FIGS. 21 to 23, in operations 2101, 2201, and 2301 according to an exemplary embodiment, a network node may transmit Reference Signal (RS) resources based on different beams, and a UE may receive them. However, for example, when the network node is a location server, an LMF and/or the like, an operation of transmitting RS resources may be omitted and/or replaced with an operation of transmitting RS resource configuration information, and the like. For example, RS resource configuration information may be transmitted from the location server, the LMF and/or the like to the UE, and/or transmitted from the location server, the LMF and/or the like to a BS/TP, and transmitted from the BS/TP to the UE.

In operations 2103, 2203, and 2303 according to the exemplary embodiment, the UE may transmit information (e.g., a measured value) related to measurement for positioning based on one or more first RS resources selected from RS resources, and the network may receive the information. For example, information related to measurement for positioning may be transmitted from the UE to the location server, the LMF and/or the like, and/or transmitted from the UE to the BS/TP, and transmitted from the BS/TP to the location server, the LMF and/or the like.

For example, the one or more first RS resources may be selected based on a propagation time of each of one or more second RS resources among the RS resources.

For example, the one or more second RS resources may be selected from the RS resources based on measurement values for a signal quality of each of the RS resources.

For example, the RS resources based on the different beams may be transmitted and received based on beams having different directions, respectively.

More specific operations of the UE and/or the TP and/or the location server according to the above-described various embodiments of the present disclosure may be described and performed based on the descriptions of clause 1 to clause 3.

Examples of the above-described proposed methods may also be included as one of various embodiments of the present disclosure, and thus may be considered to be some proposed methods. While the proposed methods may be independently implemented, some of the proposed methods may be combined (or merged). It may be regulated that information indicating whether to apply the proposed methods (or information about the rules of the proposed methods) is indicated by a signal (e.g., a physical-layer signal or a higher-layer signal) predefined for the UE by the BS.

4. Exemplary Configurations of Devices Implementing Various Embodiments of the Present Disclosure

4.1. Exemplary Configurations of Devices to which Various Embodiments of the Present Disclosure are Applied FIG. 24 is a diagram illustrating devices that implement various embodiments of the present disclosure.

Figure 24:
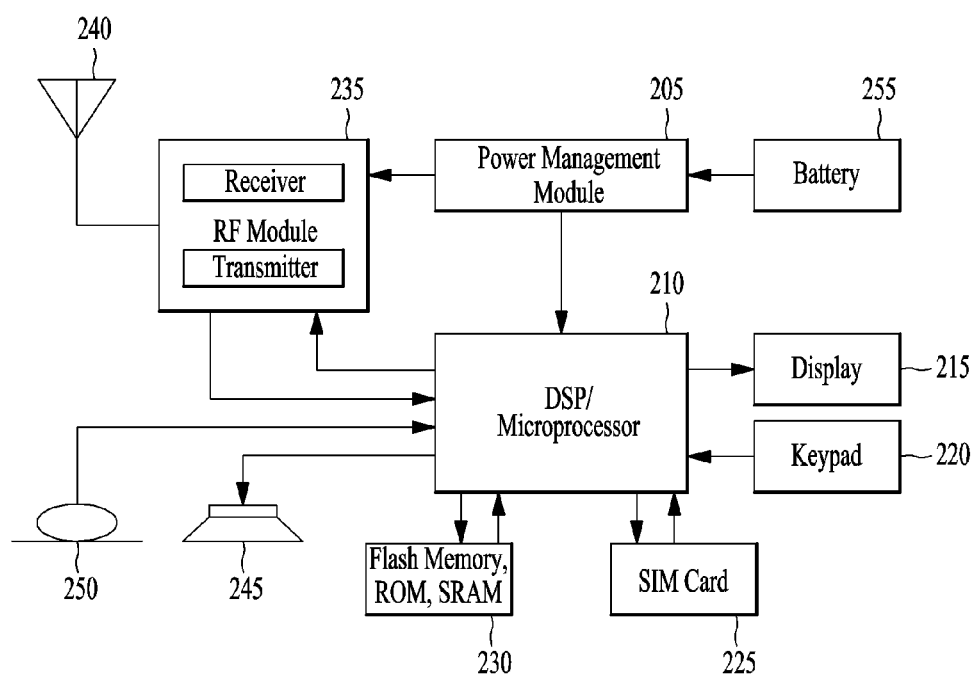
FIG. 24 is a diagram illustrating devices that implement various embodiments of the present disclosure.

The devices illustrated in FIG. 24 may be a UE and/or a BS (e.g., eNB or gNB) adapted to perform the aforedescribed mechanisms, or any devices performing the same operation.

Referring to FIG. 24, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 24 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 24 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

A processor included in a UE (or a communication device included in the UE) and a BE (or a communication device included in the BS) according to various embodiments of the present disclosure may operate as follows, while controlling a memory.

According to various embodiments of the present disclosure, a UE or a BS may include at least one transceiver, at least one memory, and at least one processor coupled to the at least one transceiver and the at least one memory. The at least one memory may store instructions causing the at least one processor to perform the following operations.

A communication device included in the UE or the BS may be configured to include the at least one processor and the at least one memory. The communication device may be configured to include the at least one transceiver, or may be configured not to include the at least one transceiver but to be connected to the at least one transceiver.

According to various embodiments of the present disclosure, one or more processors (or one or more processors of the communication device included in the UE) may receive Reference Signal (RS) resources based on different beams.

According to various embodiments of the present disclosure, one or more processors included in the UE may transmit a measurement value for positioning based on one or more first RS resources selected from the RS resources.

In an exemplary embodiment, the one or more first RS resources may be selected based on a propagation time of each of one or more second RS resources among the RS resources.

In an exemplary embodiment, the one or more second RS resources may be selected based on measurement values for signal quality of each of the RS resources.

In an exemplary embodiment, the RS resources based on the different beams may be received based on beams having different directions, respectively.

According to various embodiments of the present disclosure, one or more processors included in a network node (or one or more processors of a communication device included in the network node) may transmit RS resources based on different beams. However, for example, when the network node is a location server, an LMF and/or the like, an operation of transmitting RS resources may be omitted and/or replaced with an operation of transmitting RS resource configuration information, and the like. For example, the RS resource configuration information may be transmitted from the location server, the LMF and/or the like to the UE, and/or transmitted from the location server, the LMF and/or the like to a BS/TP, and transmitted from the BS/TP to the UE.

According to various embodiments of the present disclosure, one or more processors included in a network node may receive a measurement value for positioning based on one or more first RS resources selected from RS resources. For example, the measurement value for the positioning may be transmitted from a UE to a location server, an LMF and/or the like, and/or transmitted from the UE to a BS/TP, and transmitted from the BS/TP to the location server, the LMF and/or the like.

In an exemplary embodiment, the one or more first RS resources may be selected based on a propagation time of each of one or more second RS resources among the RS resources.

In an exemplary embodiment, the one or more second RS resources may be selected based on measurement values for signal quality of each of the RS resources.

In an exemplary embodiment, the RS resources based on the different beams may be transmitted based on beams having different directions, respectively.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 25:
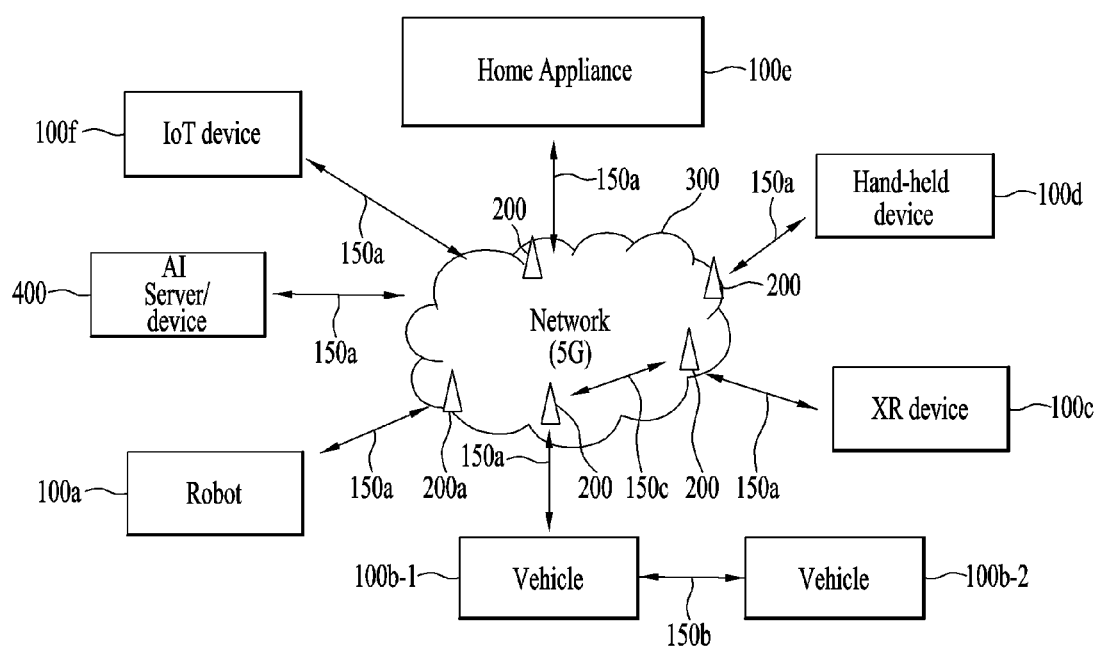
FIG. 25 illustrates an exemplary communication system to which various embodiments of the present disclosure are applied.

FIG. 25 illustrates an exemplary communication system to which various embodiments of the present disclosure are applied.

Referring to FIG. 25, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 26:
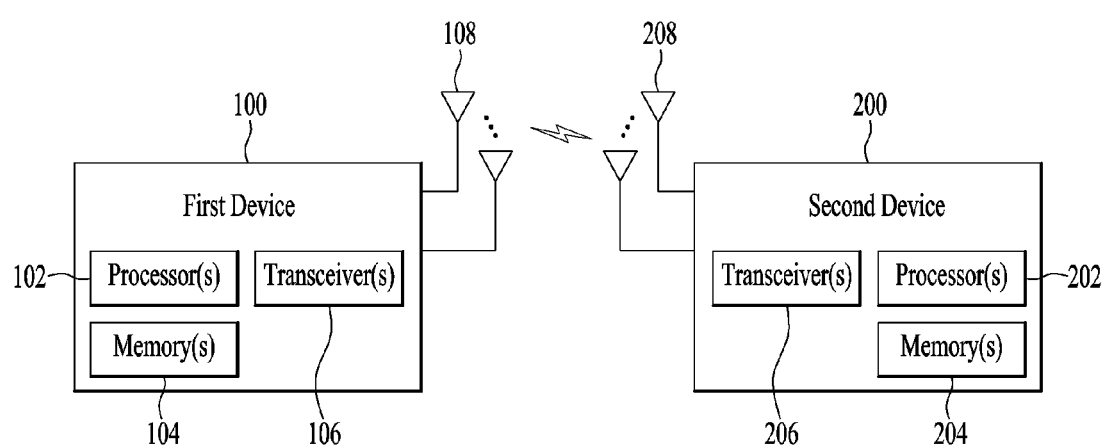
FIG. 26 illustrates exemplary wireless devices to which various embodiments of the present disclosure are applicable.

4.2.1 Example of Wireless Devices to which Various Embodiments of the Present Disclosure are Applied FIG. 26 illustrates exemplary wireless devices to which various embodiments of the present disclosure are applicable.

Referring to FIG. 26, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 27:
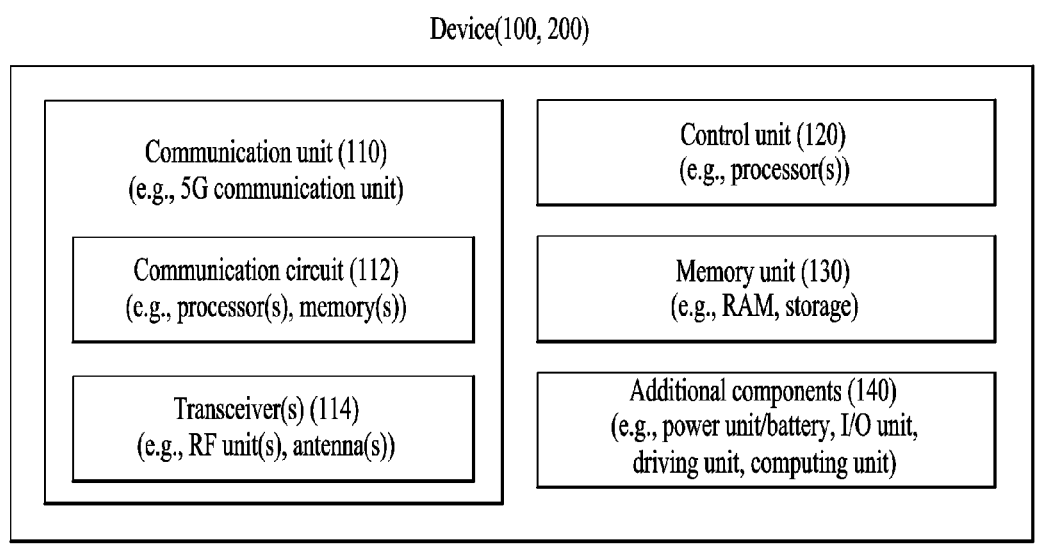
FIG. 27 illustrates other exemplary wireless devices to which various embodiments of the present disclosure are applied.

4.2.2. Example of Using Wireless Devices to which Various Embodiments of the Present Disclosure are Applied FIG. 27 illustrates other exemplary wireless devices to which various embodiments of the present disclosure are applied. The wireless devices may be implemented in various forms according to a use case/service (see FIG. 25).

Referring to FIG. 27, wireless devices 100 and 200 may correspond to the wireless devices 100 and 200 of FIG. 25 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 25. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. W1), the vehicles (100*b*-1 and 100*b*-2 of FIG. W1), the XR device (100*c* of FIG. W1), the hand-held device (100*d* of FIG. W1), the home appliance (100*e* of FIG. W1), the IoT device (100*f* of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 27, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 27 will be described in detail with reference to the drawings.

4.2.3. Example of Portable Device to which Various Embodiments of the Present Disclosure are Applied FIG. 28 illustrates an exemplary portable device to which various embodiments of the present disclosure are applied.

The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Figure 28:
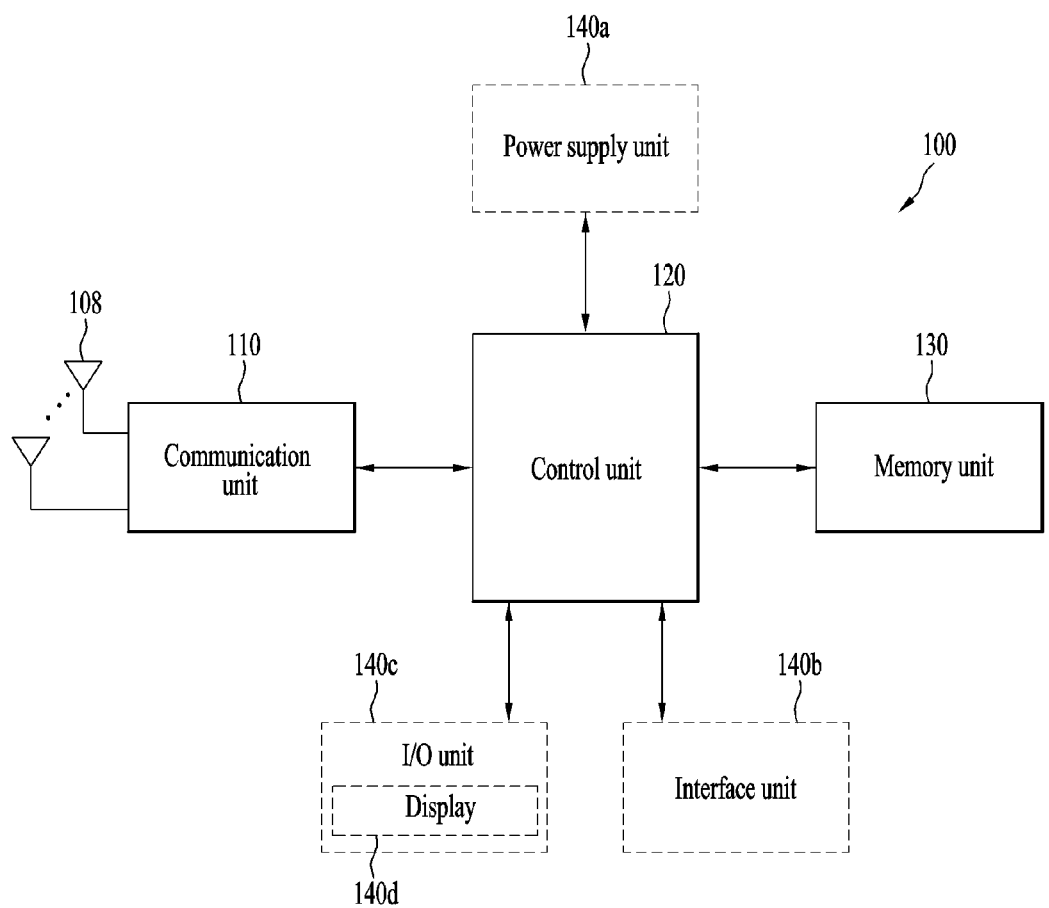
FIG. 28 illustrates an exemplary portable device to which various embodiments of the present disclosure are applied.

Referring to FIG. 28, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 29:
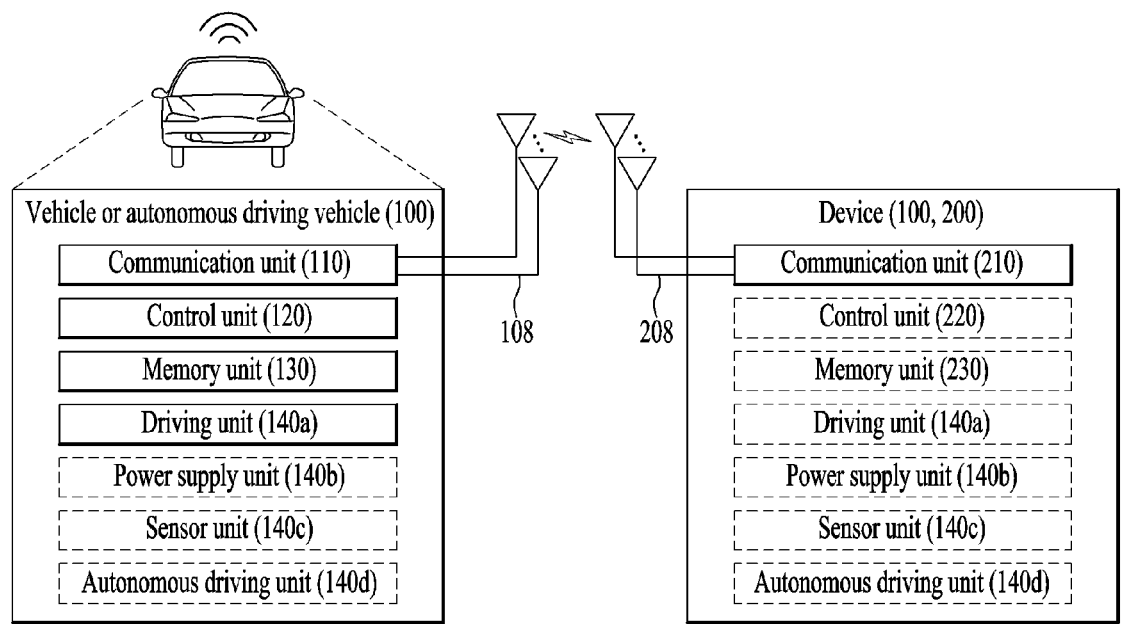
FIG. 29 illustrates an exemplary vehicle or autonomous driving vehicle to which various embodiments of the present disclosure.

4.2.4. Example of Vehicle or Autonomous Driving Vehicle to which Various Embodiments of the Present Disclosure FIG. 29 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 29, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. X3, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various radio access systems. Examples of the various radio access systems include a 3GPP (3rd Generation Partnership Project), a 3GPP2 system, and the like. Various embodiments of the present disclosure may be applied not only to the various radio access systems but also to all technical fields to which the various radio access systems are applied. Furthermore, the proposed method may be applicable to a mmWave communication system using an ultra-high frequency band.

What is claimed is:

1. A method by a user equipment comprising:
receiving information for at least one positioning reference signal (PRS) resource set;
receiving PRS resources based on the at least one PRS resource set;
measuring reference signal received powers (RSRPs) for the PRS resources
selecting one or more candidate PRS resources among the PRS resources based on the RSRPs measured for the PRS resources;
selecting one or more first PRS resources among the one or more candidate PRS resources based on a propagation time related to a line of sight (LOS) propagation path calculated for each of the one or more candidate PRS resources; and
transmitting a measurement value for positioning based on the one or more first PRS resources,
wherein the measurement value includes a reference signal time difference (RSTD) calculated based on the one or more first PRS resources.

2. The method of claim 1, wherein the one or more candidate PRS resources are selected based on being related to a measurement value for a RSRP within upper M or upper X1 percent among measurement values for the RSRP of the PRS resources,
wherein the M or X1 is configured by a location management function (LMF), a location server or a base station,
wherein the M is a natural number, and
wherein the X1 is a real number exceeding 0.

3. The method of claim 1, wherein the one or more candidate PRS resources are selected based on being related to the measurement value for the RSRP exceeding a first threshold configured each.

4. The method of claim 1, wherein based on a measurement value for a RSRP of one or more second PRS resources related to the LOS propagation path among the PRS resources:
(i) exceeding X2 percent of a maximum value among measurement values for the RSRP of the PRS resources, an average value of the measurement values, a value corresponding to upper or lower X3 percent among the measurement values, or a configured second threshold, the one or more first PRS resources are the one or more second PRS resources; or
(ii) failing to exceed X2 percent of the maximum value, the average value of the measurement values, the value corresponding to the upper or lower X3 percent among the measurement values, or the second threshold, the one or more first PRS resources are one or more PRS resources related to the maximum value,
wherein the X2 or X3 is configured from an LMF, a location server, or a base station,
wherein the X2 is a real number exceeding 0, and
wherein the X3 is a real number exceeding 0.

5. The method of claim 1, further comprising transmitting information related to an identifier (ID) of each of the one or more first PRS resources.

6. An apparatus comprising:
a memory; and
one or more processors coupled with the memory,
wherein the one or more processors are configured to:
receive information for at least one positioning reference signal (PRS) resource set;
receive PRS resources based on the at least one PRS resource set;
measure reference signal received powers (RSRPs) for the PRS resources
select one or more candidate PRS resources among the PRS resources based on the RSRPs measured for the PRS resources;
select one or more first PRS resources among the one or more candidate PRS resources based on a propagation time related to a line of sight (LOS) propagation path calculated for each of the one or more candidate PRS resources; and
transmit a measurement value for positioning based on the one or more first PRS resources,
wherein the measurement value includes a reference signal time difference (RSTD) calculated based on the one or more first PRS resources.

7. The apparatus of claim 6, wherein the one or more candidate PRS resources are selected based on being related to a measurement value for a signal quality within upper M or upper X1 percent among measurement values for signal qualities of the PRS resources,
wherein the M or X1 is configured by a location management function (LMF), a location server or a base station,
wherein the M is a natural number, and
wherein the X1 is a real number exceeding 0.

8. The apparatus of claim 6, wherein the one or more candidate PRS resources are selected based on being related to the measurement value for a signal quality exceeding a first threshold configured each.

9. The apparatus of claim 6, wherein based on a measurement value for a signal quality of one or more second PRS resources related to the LOS propagation path among the PRS resources:
(i) exceeding X2 percent of a maximum value among measurement values for the signal qualities of the PRS resources, an average value of the measurement values, a value corresponding to upper or lower X3 percent among the measurement values, or a configured second threshold, the one or more first PRS resources are the one or more third RS second PRS resources; or
(ii) failing to exceed X2 percent of the maximum value, the average value of the measurement values, the value corresponding to the upper or lower X3 percent among the measurement values, or the second threshold, the one or more first PRS resources are one or more PRS resources related to the maximum value,
wherein the X2 or X3 is configured from an LMF, a location server, or a base station,
wherein the X2 is a real number exceeding 0, and
wherein the X3 is a real number exceeding 0.

10. The apparatus of claim 6, wherein the one or more processors are further configured to transmit information related to an identifier (ID) of each of the one or more first PRS resources.

11. The apparatus of claim 6, wherein the apparatus is configured to communicate with one or more of a mobile terminal, a network, and an autonomous vehicle other than a vehicle comprising the apparatus.

12. An apparatus comprising:
one or more processors; and
one or more memories storing one or more instructions to enable the one or more processors to perform a method, the method comprising:
receiving information for at least one positioning reference signal (PRS) resource set;
receiving PRS resources based on the at least one PRS resource set;
measuring reference signal received powers (RSRPs) for the PRS resources selecting one or more candidate PRS resources among the PRS resources based on the RSRPs measured for the PRS resources;
selecting one or more first PRS resources among the one or more candidate PRS resources based on a propagation time related to a line of sight (LOS) propagation path calculated for each of the one or more candidate PRS resources; and
transmitting a measurement value for positioning based on the one or more first PRS resources,
wherein the measurement value includes a reference signal time difference (RSTD) calculated based on the one or more first PRS resources.

13. A non-statutory processor-readable medium storing one or more instructions to enable one or more processors to perform a method, the method comprising:
receiving information for at least one positioning reference signal (PRS) resource set;
receiving PRS resources based on the at least one PRS resource set;
measuring reference signal received powers (RSRPs) for the PRS resources
selecting one or more candidate PRS resources among the PRS resources based on the RSRPs measured for the PRS resources;
selecting one or more first PRS resources among the one or more candidate PRS resources based on a propagation time related to a line of sight (LOS) propagation path calculated for each of the one or more candidate PRS resources; and
transmitting a measurement value for positioning based on the one or more first PRS resources,
wherein the measurement value includes a reference signal time difference (RSTD) calculated based on the one or more first PRS resources.

* * * * *